(12) United States Patent
Yamada et al.

(10) Patent No.: US 9,239,178 B2
(45) Date of Patent: Jan. 19, 2016

(54) REFRIGERANT DISTRIBUTOR AND REFRIGERATION CYCLE DEVICE

(75) Inventors: Etsuhisa Yamada, Kariya (JP); Haruyuki Nishijima, Obu (JP); Tatsuhiro Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 504 days.

(21) Appl. No.: 13/430,087

(22) Filed: Mar. 26, 2012

(65) Prior Publication Data

US 2012/0247146 A1    Oct. 4, 2012

(30) Foreign Application Priority Data

Mar. 28, 2011    (JP) ................. 2011-069536

(51) Int. Cl.
*F25B 43/00* (2006.01)
*F25B 1/00* (2006.01)
*F25B 1/06* (2006.01)
(Continued)

(52) U.S. Cl.
CPC . *F25B 43/00* (2013.01); *F25B 1/10* (2013.01); *F25B 40/02* (2013.01); *F25B 41/00* (2013.01); *F25B 1/08* (2013.01); *F25B 9/08* (2013.01); *F25B 2341/0012* (2013.01); *F25B 2400/13* (2013.01); *F25B 2400/16* (2013.01); *F25B 2400/23* (2013.01); *Y10T 137/2087* (2015.04)

(58) Field of Classification Search
CPC ................ F25B 1/08; F25B 1/10; F25B 9/08; F25B 43/00
USPC .............. 62/512, 116, 500, 509–510
See application file for complete search history.

(56) References Cited

U.S. PATENT DOCUMENTS

| 4,142,380 A * | 3/1979 | Dyhr ............... B01D 45/12 62/471 |
| 4,259,180 A * | 3/1981 | Surakka ............... D21D 5/24 209/732 |

(Continued)

FOREIGN PATENT DOCUMENTS

| CN | 101078570 | 11/2007 |
| JP | 05-322383 | 12/1993 |

(Continued)

OTHER PUBLICATIONS

Office Action issued Dec. 12, 2013 in corresponding CN Application No. 2012 1008 3976.0 (with English translation).

(Continued)

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

A refrigerant distributor includes a body portion defining a swirl space, a refrigerant inflow port, and first and second refrigerant outflow ports which causes refrigerant in the swirl space to flow out and distributes the refrigerant to components of a refrigeration cycle device. When a line connecting swirl centers of refrigerant swirling in the swirl space is taken as a swirl center line, the refrigerant swirls in the swirl space such at a velocity of a swirl flow that more vapor-phase refrigerant exists on an inner radius side than on an outer radius side and the velocity of swirl flow at the swirl center line on both end sides are different from each other. The first refrigerant outflow port is arranged at the one end side, and the second refrigerant outflow port is arranged at the other end side, on an extended line of the swirl center line.

12 Claims, 11 Drawing Sheets

(51) Int. Cl.
*F25B 39/04* (2006.01)
*F25B 1/10* (2006.01)
*F25B 40/02* (2006.01)
*F25B 41/00* (2006.01)
F25B 1/08 (2006.01)
F25B 9/08 (2006.01)

(56) References Cited

U.S. PATENT DOCUMENTS

| | | | | |
|---|---|---|---|---|
| 5,137,439 | A | * | 8/1992 | Lundin .................. F01N 1/165 181/226 |
| 5,343,711 | A | | 9/1994 | Kornhauser et al. |
| 5,706,666 | A | * | 1/1998 | Yamanaka ............ F25B 41/062 236/92 B |
| 5,778,691 | A | * | 7/1998 | Suzuki et al. ................... 62/160 |
| 7,779,647 | B2 | * | 8/2010 | Takeuchi ................ F25B 40/00 417/151 |
| 2003/0150330 | A1 | * | 8/2003 | Hotta et al. ..................... 96/406 |
| 2004/0149667 | A1 | * | 8/2004 | Meyer .................... B04C 5/181 210/787 |
| 2007/0163293 | A1 | | 7/2007 | Ikegami et al. |
| 2010/0175422 | A1 | * | 7/2010 | Yamada et al. ................. 62/512 |
| 2011/0030407 | A1 | * | 2/2011 | Yoshimi ................. F25B 9/008 63/324.5 |

FOREIGN PATENT DOCUMENTS

| | | |
|---|---|---|
| JP | 11-257299 | 9/1999 |
| JP | 11-304269 | 11/1999 |
| JP | 2001-235245 | 8/2001 |
| JP | 2008-107054 | 5/2008 |
| JP | 2008-202812 | 9/2008 |
| JP | 2008-232458 | 10/2008 |
| JP | 2010-038456 | 2/2010 |
| JP | 2010-133606 | 6/2010 |
| JP | 2010-210111 | 9/2010 |

OTHER PUBLICATIONS

Office action dated Jun. 18, 2013 in corresponding Japanese Application No. 2011-069536.

* cited by examiner

REFRIGERANT DISTRIBUTOR AND REFRIGERATION CYCLE DEVICE

CROSS REFERENCE TO RELATED APPLICATION

This application is based on Japanese Patent Application No. 2011-069536 filed on Mar. 28, 2011, the contents of which are incorporated herein by reference in its entirety.

TECHNICAL FIELD

The present disclosure relates to a refrigerant distributor that adjusts the state of refrigerant supplied to various components of a vapor compression refrigeration cycle device, and a refrigeration cycle device equipped with the refrigerant distributor.

BACKGROUND

Vapor compression refrigeration cycle devices including at least the following as constituent elements are conventionally known: a compressor that compresses and discharges refrigerant; a radiator that radiates heat from refrigerant discharged from the compressor; a pressure reducing device that reduces the pressure of refrigerant flowing out of the radiator; and an evaporator that evaporates refrigerant depressurized at the pressure reducing device. Refrigeration cycle devices with various types of cycle configuration have been proposed as this type of refrigeration cycle device to enhance cycle efficiency (COP).

For example, Patent Document 1 (JP 2001-235245A) discloses regarding a so-called economizer refrigeration cycle device. The economizer refrigeration cycle device is provided with two compression mechanisms, a lower stage compression mechanism and a higher stage compression mechanism, as a compressor to compress refrigerant in multiple stages. In this type of economizer refrigeration cycle device, the intermediate-pressure refrigerant of the cycle is joined with refrigerant discharged from the lower stage compression mechanism and the merged refrigerant is drawn into the higher stage compression mechanism.

As a result, the pressure difference between drawn refrigerant pressure and discharged refrigerant pressure, in both the lower stage compression mechanism and the higher stage compression mechanism, is reduced. The compression efficiencies of both the compression mechanisms are thereby enhanced to enhance the cycle efficiency.

Patent Document 2 (2008-107054A) discloses a so-called ejector refrigeration cycle device adopting an ejector that functions as a refrigerant circulating portion. In this type of ejector refrigeration cycle device, refrigerant is isentropically depressurized at a nozzle portion for driving of the ejector to convert pressure energy into kinetic energy.

Refrigerant flowing out of an evaporator is drawn by the suction action of high-speed sprayed refrigerant sprayed from the nozzle portion. Then the velocity energy of the sprayed refrigerant is converted into the pressure energy of drawn refrigerant at the diffuser portion of the ejector. The pressure of compressor drawn refrigerant is thereby increased to reduce the driving power of the compressor and enhance cycle efficiency.

Patent Document 3 (JP 2010-133606A) proposes an economizer refrigeration cycle device (two-stage pressure-increasing ejector refrigeration cycle device) provided with an ejector. With the economizer refrigeration cycle device, it is possible to obtain both the cycle efficiency enhancement effect from the economizer refrigeration cycle device and the cycle efficiency enhancement effect from the ejector refrigeration cycle device.

The cycle efficiency (COP) is defined as the ratio ($\Delta H/L$) obtained by dividing the refrigeration capacity $\Delta H$ delivered by the cycle by the consumed energy $L$ consumed by the compressor. Therefore, with the cycle configurations in Patent Documents 1 and 2, it can be expressed that the cycle efficiency is enhanced by reducing consumed energy $L$ as compared with ordinary refrigeration cycle devices.

According to the above definition of cycle efficiency, the further enhancement of cycle efficiency can be expected by taking the following measure with the cycle configurations in Patent Documents 1 and 2: the refrigeration capacity $\Delta H$ delivered by the cycle, that is, the enthalpy difference ($\Delta H=Hout-Hih$) between the enthalpy Hin of evaporator inlet-side refrigerant and the enthalpy Hout of evaporator outlet-side refrigerant is increased.

For example, in the economizer refrigeration cycle device disclosed in Patent Document 1, vapor-liquid two-phase refrigerant whose pressure is reduced to intermediate pressure is let to flow into a vapor liquid separator. The separated saturated vapor-phase refrigerant is drawn to the higher stage compression mechanism, and the separated saturated liquid-phase refrigerant is let to flow into the evaporator by way of a pressure reducing device. Therefore, the further enhancement of cycle efficiency may be expected by reducing the enthalpy of the saturated liquid-phase refrigerant flowing out from the vapor liquid separator toward the evaporator.

To reduce the enthalpy of saturated liquid-phase refrigerant, a configuration for reducing the pressure of refrigerant may be used. However, if the pressure of refrigerant in the vapor liquid separator is reduced, the pressure of saturated vapor-phase refrigerant flowing out from the vapor liquid separator toward the higher stage compression mechanism is also reduced. Therefore, the pressure difference between drawn refrigerant pressure and discharged refrigerant pressure in the higher stage compression mechanism is enlarged, and there is a possibility that the cycle efficiency is degraded on the contrary.

More specific description will be given. The vapor liquid separator of the economizer refrigeration cycle device in Patent Document 1 just separates refrigerant flowing there-into into saturated vapor-phase refrigerant and saturated liquid-phase refrigerant and lets the separated refrigerants flow to the downstream side. Therefore, the enthalpy of refrigerant flowing into the evaporator can be reduced but the pressure of refrigerant simultaneously flowing into the higher stage compression mechanism cannot be appropriately adjusted.

In the ejector refrigeration cycle device disclosed in Patent Document 2, the flow of refrigerant is bifurcated at a bifurcating portion placed upstream of the ejector. One flow of refrigerant is let to flow into the nozzle portion of the ejector; and the other flow of refrigerant is let to flow into the evaporator by way of the pressure reducing device. Therefore, the further enhancement of cycle efficiency may be expected by reducing the enthalpy of refrigerant flowing out from the bifurcating portion toward the evaporator.

Boiling of refrigerant can be accelerated to enhance nozzle efficiency by letting vapor-liquid two-phase refrigerant or liquid-phase refrigerant with air bubbles mixed therein flow into the nozzle portion. Therefore, the enhancement of nozzle efficiency may be expected by letting vapor-liquid two-phase refrigerant higher in enthalpy than liquid-phase refrigerant flowing out from the bifurcating portion toward the nozzle portion. The nozzle efficiency refers to energy conversion efficiency obtained when the pressure energy of refrigerant is converted into kinetic energy at the nozzle portion.

However, the bifurcating portion of the ejector refrigeration cycle device in Patent Document 1 just has a function of producing a swirl flow in refrigerant flowing into the nozzle portion, in order to enhance nozzle efficiency. Therefore, refrigerant let to flow into the nozzle portion of the ejector may be brought into a vapor-liquid two-phase state but the enthalpy of refrigerant let to flow into the evaporator cannot be reduced.

SUMMARY

The present disclosure addresses at least one of the above disadvantages.

For example, it is an object of the present disclosure to provide a refrigerant distributor, which appropriately adjusts a state of refrigerant supplied to respective cycle components connected to a downstream side to enhance cycle efficiency, and distributes the appropriately adjusted refrigerant to the respective cycle components.

It is another object of the present disclosure to provide a refrigeration cycle device including the refrigerant distributor. The refrigeration cycle device may be a vapor-compression refrigeration cycle device including a refrigerant distributor, an economizer refrigeration cycle device including a refrigerant distributor, an ejector refrigeration cycle device including a refrigerant distributor, for example.

According to an exemplary aspect of the present disclosure, a refrigerant distributor for a refrigeration cycle device includes a body portion defining a swirl space configured to swirl a refrigerant, a refrigerant inflow port from which the refrigerant flows into the swirl space, and first and second refrigerant outflow ports which causes the refrigerant in the swirl space to flow out and distributes the refrigerant to components of the refrigeration cycle device connected to the first and second refrigerant outflow ports. When a line connecting swirl centers of refrigerant swirling in the swirl space is taken as a swirl center line, the refrigerant swirls in the swirl space at such a velocity of a swirl flow that more vapor-phase refrigerant exists on an inner radius side than on an outer radius side and the velocity of swirl flow on the swirl center line at one end side and the velocity of swirl flow on the swirl center line at the other side are different from each other. Furthermore, the first refrigerant outflow port is arranged on an extended line of the swirl center line at the one end side, and the second refrigerant outflow port is arranged on an extended line of the swirl center line at the other end side.

Accordingly, the refrigerant introduced into the swirl space is swirled at such a velocity of swirl flow that more vapor-phase refrigerant exists on the inner radius side than on the outer radius side of the swirl center line. Therefore, the pressure of refrigerant that is higher in vapor phase ratio on the inner radius side can be made lower than the pressure of refrigerant on the outer radius side of the swirl center line.

Furthermore, the first and second refrigerant outflow ports are arranged on the extended line of the swirl center line. Therefore, the following refrigerant can be let to flow out from the first and second refrigerant outflow ports: refrigerant of high vapor-phase ratio, lower in pressure than refrigerant that flows at the outer radius side of the swirl center line, that is, than the refrigerant that flows from the refrigerant inflow port into the swirl space.

The velocity of swirl flow on the one end side of the swirl center line and the velocity of swirl flow on the other end side are different from each other. Therefore, the vapor phase ratio of refrigerant flowing out of the first refrigerant outflow port placed on the extended line of the swirl center line on the one end side can be made different from the vapor phase ratio of refrigerant flowing out of the second refrigerant outflow port placed on the extended line of the swirl center line on the other end side.

Thus, it is possible to make different from each other, for the state of refrigerant supplied to a cycle component connected to the first refrigerant outflow port and the state of refrigerant supplied to a cycle component connected to the second refrigerant outflow port. As a result, it is possible to provide a refrigerant distributor capable of appropriately adjusting the state of refrigerant supplied to respective cycle components and distributing the refrigerant to enhance cycle efficiency.

For example, the swirl space may include a tapered space having a sectional area perpendicular to a direction in which the first refrigerant outflow port and the second refrigerant outflow port are connected together, and the sectional area of the tapered space in the swirl space is gradually reduced toward one of the first and second refrigerant outflow ports. The refrigerant distributor may further include a tapered portion connected to the first refrigerant outflow port, and a body member. The tapered portion may have therein a refrigerant passage area gradually enlarged toward a refrigerant downstream side. The body member may include a refrigerant suction port from which refrigerant is drawn by a jet flow of the refrigerant injected from the tapered portion and a diffuser portion for increasing a pressure of mixed refrigerant of the refrigerant injected from the tapered portion and the refrigerant drawn from the refrigerant suction port. In this case, the first refrigerant outflow port may be configured to have a throttle that reduces a refrigerant passage area to decompress the refrigerant. Furthermore, the first and second refrigerant outflow ports may be configured to reduce the refrigerant passage area so as to decompress the refrigerant, and at least one of the first refrigerant outflow port and the second refrigerant outflow port may be configured to have a fixed throttle in which the refrigerant passage area is fixed and throttled.

The refrigerant distributor can be suitably used for a vapor-compression refrigeration cycle device, an economizer refrigeration cycle device, an ejector refrigeration cycle device, for example.

BRIEF DESCRIPTION OF THE DRAWINGS

The above and other objects and advantages of the present disclosure will be more readily apparent from the following detailed description made with reference to the accompanying drawings. In the drawings.

DETAILED DESCRIPTION

Figure 1:
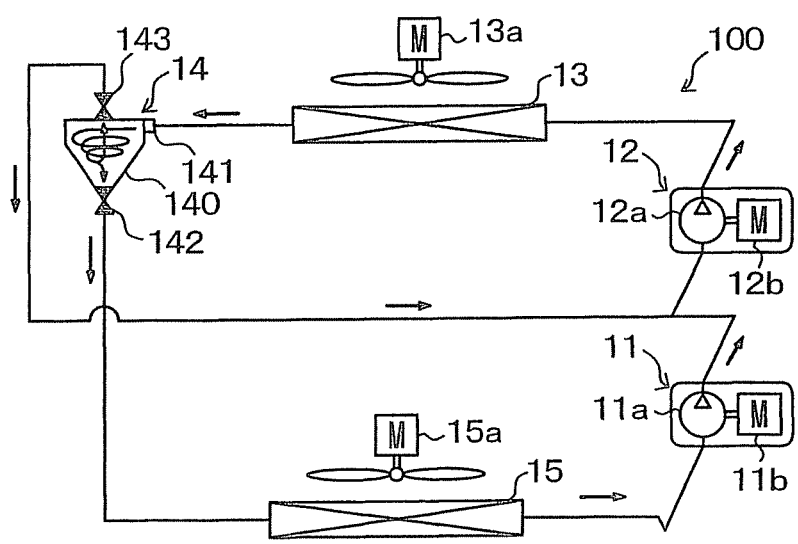
FIG. 1 is a schematic diagram showing a refrigeration cycle device according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A description will be given to a first embodiment with reference to FIGS. 1 to 3. FIG. 1 is a schematic diagram of a vapor compression refrigeration cycle device 100 provided with a refrigerant distributor 14 in the first embodiment. The refrigeration cycle device 100 is applied to an air conditioner for vehicle and carries out a function of cooling blown air to be sent into a vehicle compartment as the space to be cooled.

The refrigeration cycle device 100 includes two compressors, a lower stage compressor 11 and a higher stage compressor 12 and increases the pressure of refrigerant in multiple stages. The refrigeration cycle device 100 is configured as a so-called economizer refrigeration cycle device in which the intermediate-pressure refrigerant in the cycle is joined with refrigerant discharged from the lower stage compressor 11 and the merged refrigerant is drawn into the higher stage compressor 12.

In this type of economizer refrigeration cycle device, the cycle efficiency (COP) can be enhanced by taking the following measure: the pressure difference between drawn refrigerant pressure and discharged refrigerant pressure in each of the lower stage compressor 11 and the higher stage compressor 12 is reduced and the compression efficiencies of both the compressors 11, 12 are thereby enhanced.

In the refrigeration cycle device 100, first, the lower stage compressor 11 sucks low-pressure refrigerant and increases the pressure thereof until the low-pressure refrigerant is turned into intermediate-pressure refrigerant and discharges the pressurized refrigerant. Specifically, the lower stage compressor 11 in this embodiment is an electric compressor configured by housing a lower stage compression mechanism 11a and a lower stage motor 11b that drives the lower stage compression mechanism 11a in one housing.

Various types of compression mechanism, including a scroll compression mechanism, a vane compression mechanism, and the like, can be adopted as the lower stage compression mechanism 11a. The lower stage motor 11b has the operation (number of revolutions) thereof controlled according to control signals outputted from the control device described later and whichever type, alternating-current motor or a direct-current motor, may be adopted.

The suction side of the higher stage compressor 12 is connected to the discharge port of the lower stage compressor 11. The higher stage compressor 12 sucks intermediate-pressure refrigerant discharged from the lower stage compressor 11 and intermediate-pressure refrigerant flowing out of the second refrigerant outflow port 143 of the refrigerant distributor 14 described later. The higher stage compressor 12 increases the pressure of the merged refrigerant until the refrigerant is turned into high-pressure refrigerant and discharges the pressurized refrigerant. The basic configuration thereof is identical with the basic configuration of the lower stage compressor 11. Therefore, the higher stage compressor 12 is so configured that the higher stage compressor includes a higher stage compression mechanism 12a and a higher stage motor 12b.

The refrigerant inlet side of a radiator 13 is connected to the discharge port of the higher stage compressor 12. The radiator 13 is a heat exchanger for heat radiation that causes the high-pressure refrigerant discharged from the higher stage compressor 12 and the air outside the vehicle compartment (outside air) sent by a cooling fan 13a to exchange heat. The radiator 13 thereby radiates and cools the high-pressure refrigerant. The cooling fan 13a is an electric air blower whose number of revolutions (blown air quantity) is controlled by control voltage outputted from the control device.

The refrigeration cycle device 100 in this embodiment adopts HFC refrigerant (specifically, R134a) as the refrigerant and the refrigerant comprises a subcritical refrigeration cycle device in which the high-side refrigerant pressure does not exceed the critical pressure of the refrigerant. Needless to add, HFO refrigerant (specifically, R1234yf) or the like may be adopted as long as the refrigerant comprises a subcritical refrigeration cycle device. Therefore, the radiator 13 functions as a condenser that condenses refrigerant. Refrigerating machine oil for lubricating the compressor 11 is mixed in the refrigerant. Part of the refrigerating machine oil is circulated in the cycle together with refrigerant.

The refrigerant inflow port 141 of the refrigerant distributor 14 is connected to the outlet side of the radiator 13. The refrigerant distributor 14 lets refrigerant that flowed thereinto from the refrigerant inflow port 141 flow out of first and second refrigerant outflow ports 142, 143. Then the refrigerant distributor 14 distributes the refrigerant to the cycle components (an evaporator 15 and the higher stage compressor 12 in this embodiment) connected to the first and second refrigerant outflow ports 142, 143.

Figure 2A:
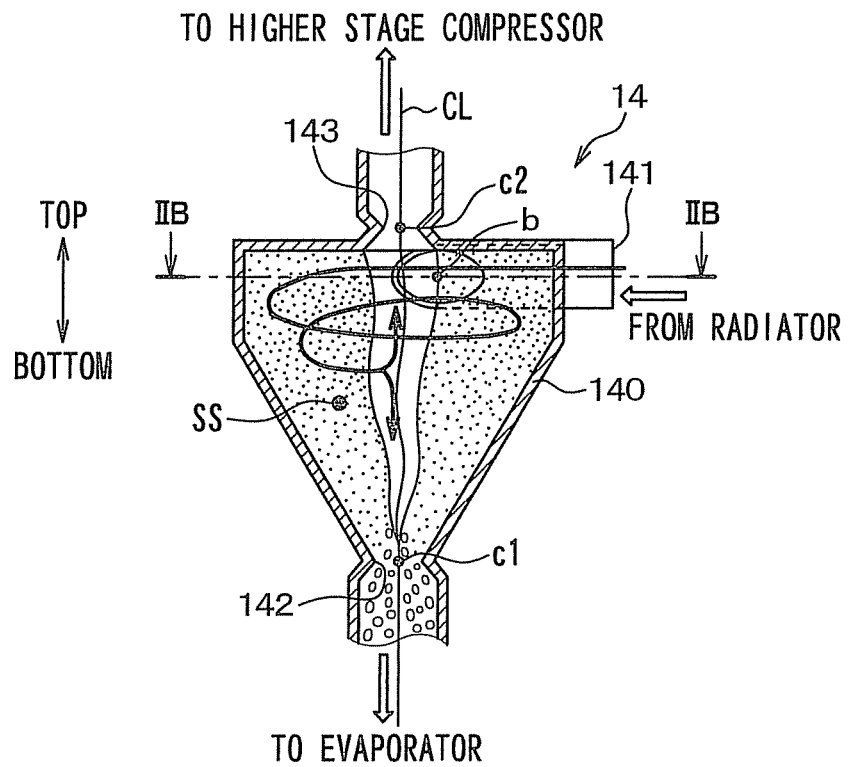
FIG. 2A is a schematic axial sectional view showing a refrigerant distributor according to the first embodiment.
Figure 2B:
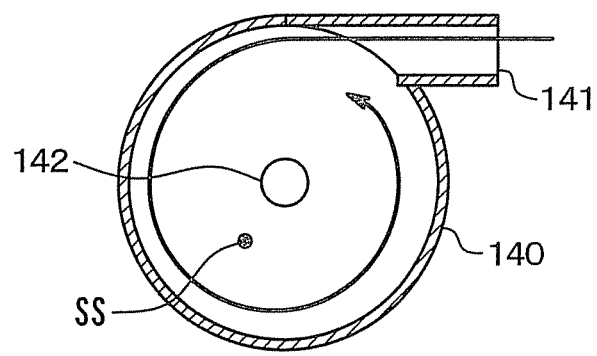
FIG. 2B is a cross-sectional view taken along the line IIB-IIB in FIG. 2A.

A concrete description will be given to the configuration of the refrigerant distributor 14 with reference to FIGS. 2A and 2B. FIG. 2A is a sectional view of the refrigerant distributor 14 in the axial direction and FIG. 2B is a sectional view taken along line IIB-IIB of FIG. 2A. In FIG. 2A, points corresponding to the states of refrigerant described later with reference to the Mollier chart in FIG. 3 are marked with the same reference codes as in FIG. 3.

The refrigerant distributor 14 has therein a body portion 140 that forms a swirl space SS for swirling refrigerant that flowed in from the refrigerant inflow port 141. The body portion 140 is formed of a metal hollow vessel whose outer shape is substantially conical and the vessel is tapered downward in the vertical direction. The swirl space SS formed in the body portion 140 is also so formed that the swirl space includes a conical (tapered) space in accordance with the outer shape of the body portion 140.

The refrigerant inflow port 141 is provided on the side of the conical side surface of the body portion 140 where the area of the cross section perpendicular to the axial direction is the larger (the upper side in this embodiment). As illustrated in FIG. 2B, the refrigerant inflow port 141 is so positioned that the following is implemented: as viewed from above, the direction of inflow of refrigerant flowing into the swirl space SS agrees with the direction of a tangential line to a substantially circular cross section of the swirl space SS perpendicular to the axial direction.

As a result, the refrigerant that flowed in from the refrigerant inflow port 141 flows along the inner wall surface of the body portion 140 and swirls in the swirl space SS as indicated by the thick line arrow in FIG. 28. The refrigerant inflow port 141 needs not be so provided that the following is implemented: the direction of inflow of refrigerant flowing into the swirl space SS completely agrees with the direction of a tangential line to a cross' section of the swirl space SS perpendicular to the axial direction. A component in the direction of the axis of the swirl space SS may be included as long as at least a component in the direction of a tangential line to a cross section of the swirl space SS perpendicular to the axial direction.

The first refrigerant outflow port 142 is provided at one end of the body portion 140 (lower side in this embodiment) in the axial direction, corresponding to the apex of the conical shape. The first refrigerant outflow port 142 is so placed that the direction of outflow of refrigerant flowing out of the swirl space SS is substantially coaxial with the direction of the axis of the swirl space SS. The second refrigerant outflow port 143 is provided at the other end of the body portion 140 (upper side in this embodiment) in the axial direction, corresponding to the basal plane of the conical shape. The second refrigerant outflow port 143 is so placed that the direction of outflow of refrigerant flowing out of the swirl space SS is substantially coaxial with the direction of the axis of the swirl space SS.

Therefore, it turns out that the swirl space SS in this embodiment is so formed that the swirl space SS includes a tapered space. The area of a cross section of the tapered space perpendicular to the direction (axial direction) in which the central part of the first refrigerant outflow port 142 and the central part of the second refrigerant outflow port 143 are connected together is gradually reduced. The direction in which the central part of the first refrigerant outflow port 142 and the central part of the second refrigerant outflow port 143 are connected together substantially agrees with the vertical direction.

As apparent from FIG. 2A, the swirl space SS in this embodiment is in such a shape that a columnar space and a conical space are coaxially joined with each other. When the line connecting the swirl centers of refrigerant swirling in the swirl space SS is defined as swirl center line CL, consequently, the following takes place: the swirl center line CL is not steadily straight because of disturbance in a refrigerant flow or the like but the swirl center line CL substantially agrees with the direction of the axis of the swirl space SS.

Therefore, it turns out that: the first refrigerant outflow port 142 in this embodiment is placed on the extended line of the swirl center line CL on the one end side; and the second refrigerant outflow port 143 is placed on the extended line of the swirl center line CL on the other end side.

Since the swirl space SS is so formed that the swirl space SS includes a tapered space, the following velocities of swirl flow take different values: the velocity of swirl flow of refrigerant swirling on the side (the one end side of the swirl center line CL) where the sectional area perpendicular to the axial direction is smaller in the tapered space; and the velocity of swirl flow of refrigerant swirling on the side (the other end side of the swirl center line CL) where the sectional area perpendicular to the axial direction is larger in the tapered space. In this embodiment, the velocity of flow in the direction of swirl of refrigerant on the outermost radius side in the swirl space SS among the sections perpendicular to the swirl center line CL is adopted as the velocity of swirl flow.

Centrifugal force acts on refrigerant swirling in the swirl space SS. Therefore, when vapor-liquid two-phase refrigerant flows in from the refrigerant inflow port 141, liquid-phase refrigerant high in density is unevenly distributed on the outer radius side of the swirl center. Consequently, when vapor-liquid two-phase refrigerant flows in from the refrigerant inflow port 141, more vapor-phase refrigerant exists on the inner radius side of the swirl center line CL than on the outer radius side.

The refrigerant pressure is made lower in proximity to the swirl center line CL than on the outer radius side of the swirl center line CL by the above action of centrifugal force. The refrigerant pressure in proximity to the swirl center line CL is reduced with increase in centrifugal force. Therefore, the refrigerant pressure in proximity to the swirl center line CL is reduced with increase in the velocity of swirl flow of refrigerant swirling in the swirl space SS.

Therefore, the following can be implemented by sufficiently increasing the velocity of swirl flow to reduce the refrigerant pressure in proximity to the swirl center line CL until the refrigerant is boiled under reduced pressure (cavitation occurs): even when liquid-phase refrigerant flows in from the refrigerant inflow port 141, it is possible to make more vapor-phase refrigerant to exist on the inner radius side of the swirl center line CL than on the outer radius side.

In the first embodiment, consequently, Ain, Aout, and Ass are determined so that Formulas F1 and F2 below are met when the passage sectional area of the refrigerant inflow port 141 is let to be Ain; the passage sectional area of the first refrigerant outflow port 142 is let to be Aout; and the maximum sectional area perpendicular to the direction of the axis of the swirl space SS (that is, the sectional area of the swirl space SS in FIG. 2A) is let to be Ass:

$$1 < Ain/Aout < 12 \tag{F1}$$

$$1 < Ass/Aout \tag{F2}$$

In this embodiment, more specifically, Ain/Aout is set to 2 or so and Ass/Aout is set to 10 or so.

Ain/Aout in Formula F1 is the ratio of the passage sectional area of the refrigerant inflow port 141 to the passage sectional area of the first refrigerant outflow port 142. Therefore, the velocity of flow of refrigerant flowing from the refrigerant inflow port 141 into the swirl space SS is increased with decrease in Ai/Aout and the velocity of flow of refrigerant swirling in the swirl space SS can be increased.

When Ain/Aout is too small, the refrigerant inflow port 141 itself functions as a throttle and loss is produced in the energy of refrigerant flowing into the swirl space SS. For this reason, there is an appropriate range of Ain/Aout to sufficiently reduce the refrigerant pressure in proximity to the swirl center line CL in the swirl space SS.

Ass/Aout in Formula F2 is the ratio of the maximum sectional area of the swirl space SS to the passage sectional area of the first refrigerant outflow port 142. The refrigerant inflow port 141 is placed on the outermost radius side of the swirl space SS and the first refrigerant outflow port 142 is placed on the extended line of the swirl center line CL. Therefore, Ass/Aout can be used as an index indicating the distance between the swirl center and the outermost radius side of swirl flow. To sufficiently grow a swirl flow of refrigerant swirling in the swirl space SS, it is desirable to ensure a sufficient distance between the swirl center and the outermost radius of swirl flow.

The present inventors conducted a verification test based on these pieces of knowledge and verified that the following can be implemented by determining Ain, Aout, and Ass so that Formulas F1 and F2 are met: a velocity of swirl flow at which the refrigerant pressure in proximity to the swirl center line CL is reduced until the refrigerant is boiled under reduced pressure can be achieved.

In this embodiment, the following velocities of swirl flow takes different values: the velocity of swirl flow of refrigerant swirling on the first refrigerant outflow port 142 side (the one end side of the swirl center line CL); and the velocity of swirl flow of refrigerant swirling on the second refrigerant outflow port 143 side (the other end side of the swirl center line CL). Therefore, the following vapor phase ratios also take different values: the vapor phase ratio of refrigerant at the swirl center on the first refrigerant outflow port 142 side (the one end side of the swirl center line CL); and the vapor phase ratio of refrigerant at the swirl center on the second refrigerant outflow port 143 side (the other end side of the swirl center line CL).

In this embodiment, more specifically, the swirl velocity of refrigerant swirling on the first refrigerant outflow port 142 side is lower than the swirl velocity of refrigerant swirling on the second refrigerant outflow port 142 side. Therefore, the vapor phase ratio of refrigerant at the swirl center on the first refrigerant outflow port 142 side is lower than the vapor phase ratio of refrigerant at the swirl center on the second refrigerant outflow port 143 side.

As is apparent from FIG. 2A, the refrigerant passage sectional area of each of the first and second refrigerant outflow ports 142, 143 in this embodiment is smallest in the refrigerant passage through which refrigerant flowing out of the swirl space SS flows. Therefore, the first and second refrigerant outflow ports 142, 143 each function as a fixed throttle that reduces the refrigerant passage area to reduce the pressure of refrigerant.

The first refrigerant outflow port 142 is formed at the apex of the conical shape of the body portion 140; therefore, the conical inner wall surface of the body portion 140 and the first refrigerant outflow port 142 form a refrigerant passage that functions as a nozzle. In this embodiment, the velocity of flow of refrigerant flowing out of the first refrigerant outflow port 142 is increased and brought close to the acoustic velocity by the shape of the refrigerant passage.

The refrigerant inlet side of the evaporator 15 is connected to the first refrigerant outflow port 142 of the refrigerant distributor 14. The evaporator 15 is a heat exchanger for heat absorption that causes the following to exchange heat therebetween: low-pressure refrigerant depressurized when the refrigerant passes through the first refrigerant outflow port 142; and blown air sent from an air blowing fan 15a into the vehicle compartment. The evaporator 15 thereby evaporates and causes the low-pressure refrigerant to perform heat absorbing action.

The air blowing fan 15a is an electric air blower whose number of revolutions (blown air quantity) is controlled by control voltage outputted from the control device. The suction side of the lower stage compressor 11 is connected to the outlet side of the evaporator 15. As mentioned above, the suction side of the higher stage compressor 12 is connected to the second refrigerant outflow port 142 of the refrigerant distributor 14.

The control device, not shown, is comprises of a publicly known microcomputer including CPU, ROM, RAM, and the like and peripheral circuits thereof. The control device carries out varied computation processing based on control programs stored in the ROM to control the operation of the above-mentioned electric actuators 11b, 12b, 13a, 15a, and the like.

The control device is inputted with the following: the detection values from a sensor group (not shown) including an outside air sensor for detecting the outside air temperature, an inside air temperature sensor for detecting the temperature in the vehicle compartment, and the like; and various operation signals from an operation panel (not shown) provided with an actuation switch for actuating the air conditioner for vehicles and the like.

The control device in this embodiment is obtained by integrally configuring controlling portion for controlling the operations of various controlled devices connected to the output side thereof. In the control device, configurations (hardware and software) for controlling the operation of each controlled device provide control portion for each controlled device.

In this embodiment, for example, the configuration (hardware and software) for controlling the operation of the lower stage motor 11b of the lower stage compressor 11 provides a control portion for lower stage discharge capability; and the configuration (hardware and software) for controlling the operation of the higher stage motor 12b of the higher stage compressor 12 provides a control portion for higher stage discharge capability.

A description will be given to the operation of this embodiment configured as mentioned above with reference to the Mother chart in FIG. 3. When the actuation switch in the operation panel is turned on, the control device actuates the lower stage and higher stage motors 11b, 12b, cooling fan 13a, air blowing fan 15a, and the like.

As a result, the higher stage compressor 12 sucks and compresses refrigerant and discharges the compressed refrigerant. The high-temperature, high-pressure vapor-phase refrigerant (point a2 in FIG. 3) discharged from the higher stage compressor 12 flows into the radiator 13. The vapor-phase refrigerant exchanges heat with blown air (outside air) sent from the cooling fan 13a and radiates heat and is condensed (point a2→point b in FIG. 3).

The refrigerant flowing out of the radiator 13 flows into the refrigerant distributor 14. In the refrigerant distributor 14, the refrigerant swirls and the refrigerant pressure is thereby made lower on the inner radius side of the swirl center than on the outer radius side (point b→point c1 and point c2 in FIG. 3).

In this embodiment, the swirl velocity of refrigerant swirling on the first refrigerant outflow port 142 side is made lower than the swirl velocity of refrigerant swirling on the second refrigerant outflow port 143 side to implement the following: the vapor phase ratio of refrigerant at the swirl center on the first refrigerant outflow port 142 side is controlled to so low a value that air bubbles are mixed in liquid-phase refrigerant; and the vapor phase ratio of refrigerant at the swirl center on the second refrigerant outflow port 143 side is controlled to a high value close to that of saturated vapor-phase refrigerant.

That is, in the refrigerant distributor 14 in this embodiment, the pressure on the inner radius side of the swirl center line CL of refrigerant that flowed into the swirl space SS is reduced. Then in the refrigerant with the pressure thereof reduced, the liquid-phase refrigerant (point c1 in FIG. 3) whose vapor phase ratio is extremely low and which has air bubbles mixed therein is let to flow out of the first refrigerant outflow port 142; and the refrigerant (point c2 in FIG. 3) whose vapor phase ratio is close to that of saturated vapor-phase is let to flow out of the second refrigerant outflow port 143.

Figure 3:
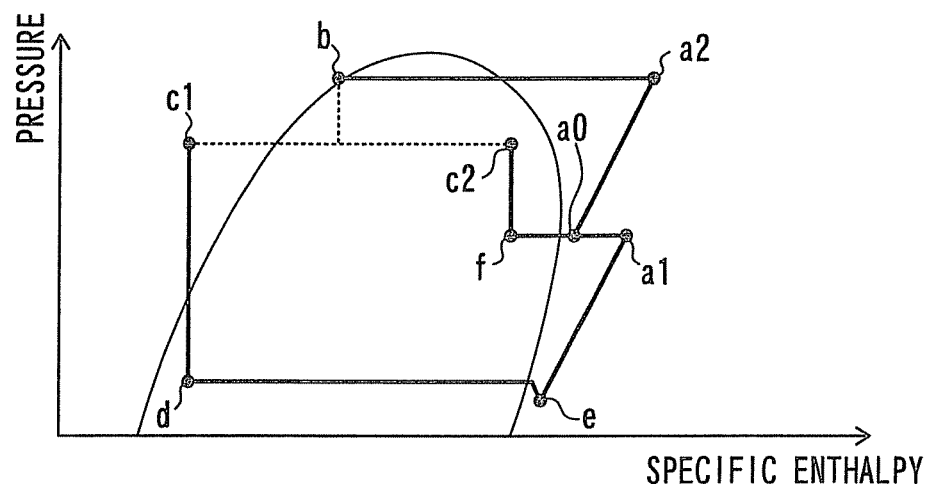
FIG. 3 is a Mollier diagram showing refrigerant states in a refrigerant cycle of the refrigeration cycle device according to the first embodiment.

When the refrigerant flowing out of the first refrigerant outflow port 142 passes through the first refrigerant outflow port 142 functioning as a throttle, the pressure thereof is isenthalpically reduced until the refrigerant is turned into low-pressure refrigerant (point c1→point d in FIG. 3). The refrigerant depressurized at the first refrigerant outflow port 142 flows into the evaporator 15 and absorbs heat from blown air sent by the air blowing fan 15a and is evaporated (point d→point e in FIG. 3). The blown air sent into the vehicle compartment is thereby cooled.

The refrigerant that flowed out of the evaporator 15 is drawn into the lower stage compressor 11 and is compressed until the refrigerant is turned into intermediate-pressure refrigerant and is discharged (point e→point a1 in FIG. 3). Since inlet pressure loss of the lower stage compressor 11 is produced in the refrigerant drawn into the lower stage compressor 11, the pressure at point e in FIG. 3 is lower than the pressure at point d.

When the refrigerant flowing out of the second refrigerant outflow port 143 passes through the second refrigerant outflow port 143 functioning as a throttle, the pressure thereof is isenthalpically reduced until the refrigerant is turned into intermediate-pressure refrigerant (point c2→point f in FIG. 3). The refrigerant depressurized at the second refrigerant outflow port 143 is joined with refrigerant discharged from the lower stage compressor 11 and drawn into the higher stage compressor 12 (point f→point a0 and point a1→point a0 in FIG. 3).

The refrigeration cycle device 100 in this embodiment operates as mentioned above. Therefore, it is possible to cause refrigerant to perform heat absorbing action at the evaporator 15 and cool blown air sent into the vehicle compartment. With the refrigeration cycle device 100, not only the above-mentioned cycle efficiency enhancement effect of the economizer refrigeration cycle device is obtained. The following effects superior to those from economizer refrigeration cycle devices of conventional technologies can also be obtained:

In the refrigeration cycle device 100, the refrigerant that flowed from the refrigerant inflow port 141 into the swirl space SS of the body portion 140 is swirled at such a velocity of swirl flow that the following is implemented: more vapor-phase refrigerant exists on the inner radius side of the swirl center line CL than on the outer radius side. Therefore, the pressure of refrigerant higher in vapor phase ratio on the inner radius side of the swirl center line CL in the swirl space SS can be made lower than the following pressure by the action of centrifugal force: the pressure of refrigerant lower in vapor phase ratio on the outer radius side of the swirl center line CL.

The first and second refrigerant outflow ports 142, 143 are placed on the extended line of the swirl center line CL. Therefore, it is possible to let refrigerant relatively low in pressure on the inner radius side of the swirl center line CL flow out of the first and second refrigerant outflow ports 142, 143. As a result, it is unnecessary to provide a pressure reducing portion for depressurizing refrigerant immediately after the refrigerant flows out of the radiator 13 unlike conventional technologies. Consequently, it is possible to reduce the size and cost of the entire cycle.

The swirl space SS formed in the body portion 140 includes a tapered space. Therefore, it is possible to easily make the following velocities of swirl flow different from each other: the velocity of swirl flow of refrigerant on the one end side of the swirl center line CL and the velocity of swirl flow of refrigerant on the other end side. Thus it is possible to make the following values different from each other: the value of the vapor phase ratio of refrigerant flowing out of the first refrigerant outflow port 142 and the value of the vapor phase ratio of refrigerant flowing out of the second refrigerant outflow port 143.

In this embodiment, specifically, the following measure is taken: the vapor phase ratio of refrigerant flowing out of the first refrigerant outflow port 142 and supplied to the evaporator 15 is reduced; and the vapor phase ratio of refrigerant flowing out of the second refrigerant outflow port 143 and drawn into the higher stage compressor 12. Therefore, it is possible to further enhance the cycle efficiency as compared with economizer refrigeration cycle devices of conventional technologies.

More specific description will be given. In the refrigerant flowing out of the refrigerant distributor 14, the refrigerant lower in vapor phase ratio (point c1 in FIG. 3) and the refrigerant higher in vapor phase ratio (point c2 of FIG. 3) are obtained by taking the following measure: the vapor phase ratio of refrigerant flowing in from the refrigerant inflow port 141 originally in the same state is varied. Therefore, the enthalpy of the refrigerant higher in vapor phase ratio is higher than the enthalpy of the refrigerant flowing in from the refrigerant inflow port 141; and the enthalpy of the refrigerant lower in vapor phase ratio is lower than the enthalpy of the refrigerant flowing in from the refrigerant inflow port 141.

The refrigerant lower in enthalpy and vapor phase ratio is supplied from the first refrigerant outflow port 142 to the evaporator 15. As a result, the enthalpy difference between the enthalpy of the inlet side refrigerant of the evaporator 15 and the enthalpy of the outlet-side refrigerant can be expanded. In the refrigerant distributor in this embodiment, the direction in which the first refrigerant outflow port 142 and the second refrigerant outflow port 143 are connected together contains a component in the vertical direction. At the above time, therefore, it is possible to reliably reduce the vapor phase ratio of refrigerant on the first refrigerant outflow port 142 swirling on the lower side in the vertical direction by utilizing the action of gravity.

The vapor phase ratio of refrigerant flowing into the evaporator 15 is reduced. Therefore, it is possible to suppress pressure loss produced when the refrigerant passes through the evaporator 15 and reduce driving power for the lower stage compressor 11 and the higher stage compressor 12.

Refrigerant is supplied from inside the swirl space SS of the refrigerant distributor 140 to the suction side of the higher stage compressor 12 by way of the second refrigerant outflow port 143 that functions as a throttle. Therefore, refrigerant can be easily guided from the swirl space SS side where the pressure is high to the suction side of the higher stage compressor 12 where the pressure is low. As a result, it is also possible to suppress the inlet pressure loss of the higher stage compressor 12 to reduce driving power for the higher stage compressor 12.

The conical inner wall surface of the body portion 140 and the first refrigerant outflow port 142 form a refrigerant passage that functions as a nozzle. The velocity of flow of refrigerant flowing out of the first refrigerant outflow port 142 is thereby increased to a high velocity close to the acoustic velocity. Therefore, even when the flow of refrigerant on the downstream side of the first refrigerant outflow port 142 is disturbed, the following transmission can be suppressed: the transmission of this disturbance in the flow of refrigerant on the downstream side to inside the swirl space SS through the first refrigerant outflow port 142.

Therefore, it is possible to stabilize the flow rate of refrigerant flowing out of the swirl space SS through the first and second refrigerant outflow ports 142, 143. At the same time, the effects obtained by taking the following measure can be obtained without fail: in the swirl space SS, refrigerant is swirled at such a velocity of swirl flow that more vapor-phase refrigerant exists on the inner radius side of the swirl center line CL than on the outer radius side.

The following can also be implemented by appropriately adjusting the amount of depressurization of refrigerant at the second refrigerant outflow port 143: the compression efficiencies of both the compression mechanisms 11, 12 can be appropriately enhanced to obtain the effect of enhancement of the cycle efficiency of the economizer refrigeration cycle device without fail. As a result, it is possible to further enhance the cycle efficiency than in economizer refrigeration cycle devices of conventional technologies.

That is, with the refrigerant distributor 14 in this embodiment, the following states can be appropriately made different from each other: the state of refrigerant supplied to a cycle component connected on the downstream side of the first refrigerant outflow port 142; and the state of refrigerant supplied to a cycle component connected on the downstream side of the second refrigerant outflow port 143. As a result, it is possible to appropriately adjust the state of refrigerant supplied to each of various cycle components to enhance the cycle efficiency and further enhance the cycle efficiency than in economizer refrigeration cycle devices of conventional technologies.

(Second Embodiment)

Figure 4:
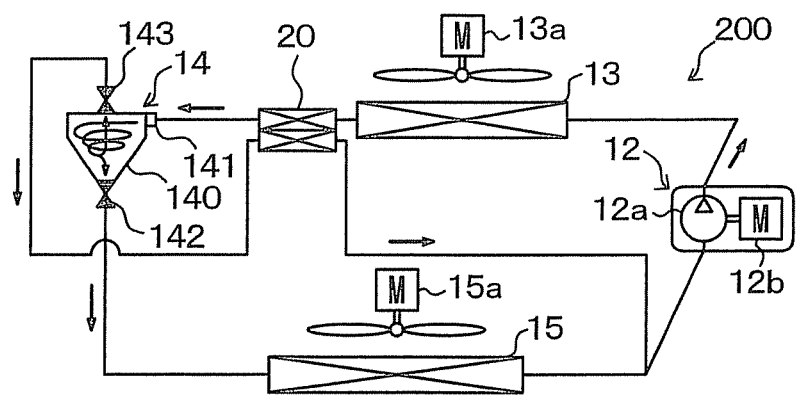
FIG. 4 is a schematic diagram showing a refrigeration cycle device according to a second embodiment of the present disclosure.

In the description of the above first embodiment, a case where the refrigerant distributor 14 is applied to the refrigeration cycle device 100 configured as an economizer refrigeration cycle device has been taken as an example. In the description of a second embodiment, a case where the refrigerant distributor 14 is applied to an ordinary refrigeration cycle device 200 provided with one compressor as illustrated in the schematic diagram in FIG. 4 will be taken as an example. In FIG. 4, the same or similar parts as in the first embodiment will be marked with the same reference numerals. This is the same with the following drawings.

More specific description will be given. The refrigeration cycle device 200 in this embodiment has a configuration equivalent to a configuration in which of the two compressors 11, 12 in the first embodiment, the lower stage compressor 11 is disused. That is, the second refrigerant outflow port 143 of the refrigerant distributor 14 and the refrigerant outflow port of the evaporator 15 are both connected to the suction side of the higher stage compressor 12. In the description of the second embodiment, consequently, the higher stage compressor 12 in the first embodiment is simply referred to as compressor 12. That is, the single compressor 12 is adapted.

The refrigeration cycle device 200 in this embodiment includes an internal heat exchanger 20 that causes the following refrigerants to exchange heat therebetween: the high-pressure refrigerant flowing out of the radiator 13 and the intermediate-pressure refrigerant flowing out of the second refrigerant outflow port 143 of the refrigerant distributor 14.

The internal heat exchanger 20 carries out the following functions by causing the high-pressure refrigerant flowing out of the radiator 13 and the low-pressure refrigerant flowing out of the second refrigerant outflow port 143 to exchange heat therebetween: a function of cooling the high-pressure refrigerant flowing out of the radiator 13 to reduce the enthalpy of refrigerant flowing into the evaporator 15; and a function of increasing the enthalpy of refrigerant drawn into the compressor 12 until the refrigerant is turned into vapor-phase refrigerant and thereby suppressing liquid compression of the compressor 12. The other configuration elements are the same as those in the first embodiment.

A description will be given to the operation of this embodiment configured as mentioned above. When the control device actuates the compressor 12, high-temperature, high-pressure refrigerant discharged from the compressor 12 flows into the radiator 13 and is condensed there. When the high-pressure refrigerant flowing out of the radiator 13 passes through the high pressure-side refrigerant pipe of the internal heat exchanger 20, the following takes place: the high-pressure refrigerant exchanges heat with the low-pressure refrigerant flowing out of the second refrigerant outflow port 143 of the refrigerant distributor 14 and the enthalpy thereof is further reduced.

The refrigerant flowing out of the high pressure-side refrigerant pipe of the internal heat exchanger 20 flows into the refrigerant distributor 14 and swirls in the swirl space SS and flows out of the first and second refrigerant outflow ports 142, 143. At the time, as in the first embodiment, the following takes place: refrigerant lower in vapor phase ratio flows out of the first refrigerant outflow port 142 and refrigerant higher in vapor phase ratio flows out of the second refrigerant outflow port 143.

When the refrigerant flowing out of the first refrigerant outflow port 142 passes through the first refrigerant outflow port 142, the pressure thereof is isenthalpically reduced and the refrigerant flows into the evaporator 15. The refrigerant absorbs heat from blown air sent by the air blowing fan 15*a* and is evaporated. The blown air sent into the vehicle compartment is thereby cooled.

When the refrigerant flowing out of the second refrigerant outflow port 143 passes through the second refrigerant outflow port 143, the pressure thereof is isenthalpically reduced. When the low-pressure refrigerant depressurized at the second refrigerant outflow port 143 passes through the low pressure-side refrigerant pipe of the internal heat exchanger 20, the following takes place: the low-pressure refrigerant exchanges heat with the refrigerant flowing out of the radiator 13 and the enthalpy thereof is increased until the refrigerant is turned into vapor-phase refrigerant. Then the refrigerant is joined with the refrigerant flowing out of the evaporator 15 and is drawn into the compressor 12.

The refrigeration cycle device 200 in this embodiment operates as mentioned above. Therefore, it is possible to cause refrigerant to perform heat absorbing action at the evaporator 15 and cool blown air sent into the vehicle compartment. Since the refrigeration cycle device 200 in this embodiment is provided with the refrigerant distributor 14, it is possible to enhance the cycle efficiency as compared with ordinary refrigeration cycle devices of conventional technologies as in the first embodiment.

That is, refrigerant low in vapor phase ratio whose enthalpy is reduced can be supplied from the first refrigerant outflow port 142 to the evaporator 15. Therefore, it is possible to increase the refrigeration capacity delivered at the evaporator 15. The vapor phase ratio of refrigerant flowing into the evaporator 15 can be reduced; therefore, it is possible to suppress pressure loss produced when refrigerant passes through the evaporator 15 and reduce driving power for the compressor 12.

Refrigerant higher in pressure than refrigerant drawn into the compressor 12 is supplied from inside the swirl space SS of the refrigerant distributor 140 to the suction side of the compressor 12. Therefore, it is possible to suppress the inlet pressure loss of the compressor 12 and reduce driving power for the compressor 12.

That is, with the refrigerant distributor 14 in this embodiment, the following states can be appropriately made different from each other: the state of refrigerant supplied to a cycle component connected on the downstream side of the first refrigerant outflow port 142; and the state of refrigerant supplied to a cycle component connected on the downstream side of the second refrigerant outflow port 143. Thus the cycle efficiency can be enhanced even when the refrigerant distributor 14 is applied to an ordinary refrigeration cycle device.
(Third Embodiment)

Figure 5:
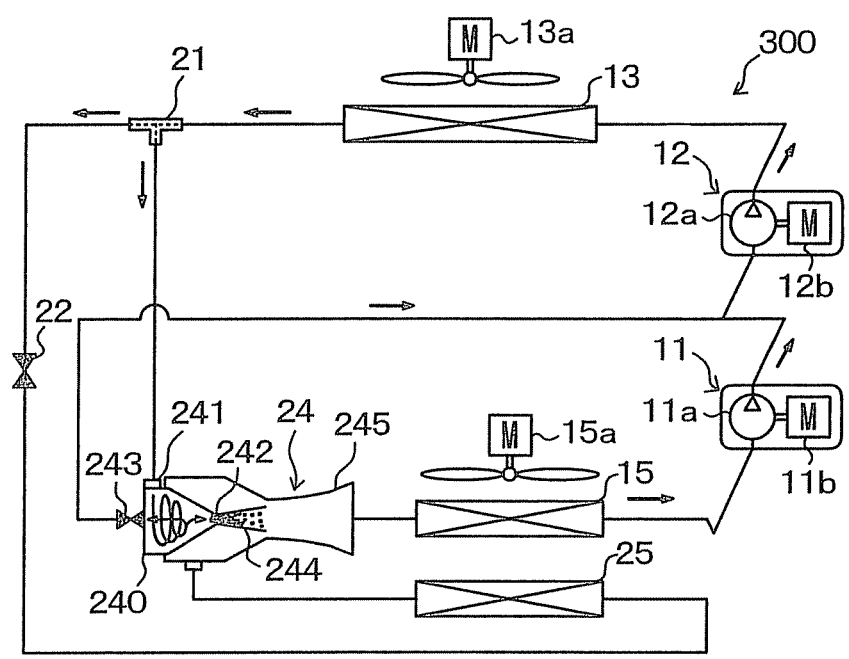
FIG. 5 is a schematic diagram showing a refrigeration cycle device according to a third embodiment of the present disclosure.

In the description of a third embodiment, a case where the configuration of the refrigerant distributor in the first embodiment is modified and the following economizer refrigeration cycle device is configured will be taken as an example: an economizer refrigeration cycle device (two-stage pressure-increasing ejector refrigeration cycle device) 300 including an ejector that functions as a refrigerant depressurizing portion and a refrigerant circulating portion as illustrated in the schematic diagram in FIG. 5.

In this type of two-stage pressure-increasing ejector refrigeration cycle device, not only the above-mentioned cycle efficiency enhancement effect of the economizer refrigeration cycle device can be obtained. It is also possible to recover kinetic energy loss produced when refrigerant is depressurized at the nozzle portion of an ejector and convert the recovered kinetic energy into pressure energy to increase the pressure of compressor drawn refrigerant. Therefore, it is possible to reduce driving power for compressors and further enhance the cycle efficiency.

Figure 6:
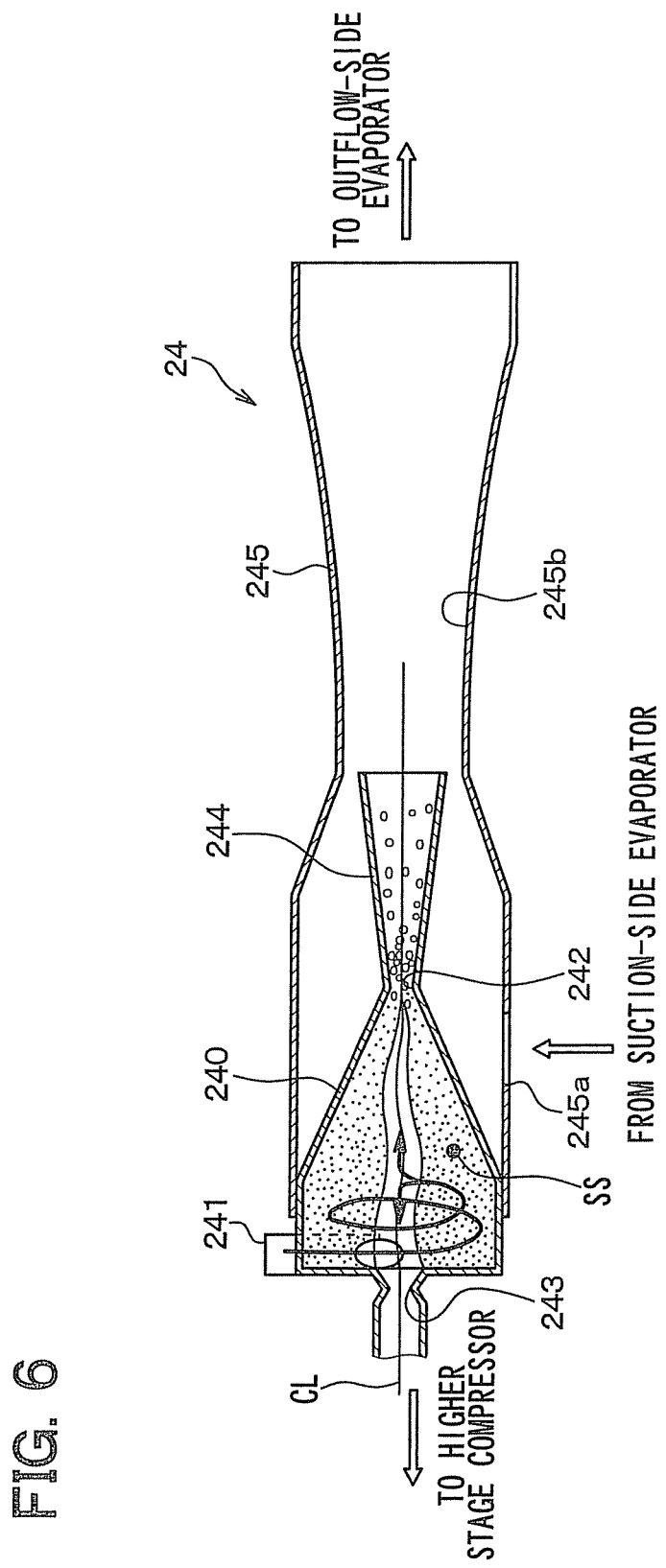
FIG. 6 is a schematic axial sectional view showing a refrigerant distributor according to the third embodiment.

A detailed description will be given to the configuration of a refrigerant distributor 24 in this embodiment with reference to FIG. 6. FIG. 6 is a sectional view of the refrigerant distributor 24 in this embodiment in the axial direction. As illustrated in FIG. 6, the refrigerant distributor 24 in this embodiment includes a body portion 240 having the same configuration as that of the body portion 140 of the refrigerant distributor 14 in the first embodiment. Therefore, the body portion 240 has a swirl space SS for swirling refrigerant formed therein and is provided with a refrigerant inflow port 241 and first and second refrigerant outflow ports 242, 243.

The refrigerant distributor 24 in this embodiment further includes: a tapered portion 244 that gradually increases the refrigerant passage area on the downstream side of the first refrigerant outflow port 242 and a body member 245. The body member 245 has the following formed therein: a refrigerant suction port 245a for drawing refrigerant by the suction action of injected refrigerant injected from the tapered portion 244; and a diffuser portion 245b for mixing and pressurizing injected refrigerant and drawn refrigerant drawn from the refrigerant suction port 245a.

The tapered portion 244 is connected to the first refrigerant outflow port 242 that functions as a throttle. The conical inner wall surface of the body portion 240 of the refrigerant distributor 24, the first refrigerant outflow port 242, and the inner wall surface of the tapered portion 244 form a refrigerant passage that functions as a so-called Laval nozzle. That is, the first refrigerant outflow port 242 in this embodiment forms a throat portion where the refrigerant passage area is most reduced in the Laval nozzle.

The body member 245 is formed in a substantially cylindrical shape and the outer radius side of the body portion 240 is fixed at one end thereof by such a portion as press fit. The refrigerant suction port 245a is a suction port for drawing refrigerant on the downstream side of the suction-side evaporator 25 described later to inside the body member 245. The refrigerant suction port 245a is placed on the outer radius side of the body portion 240 and the tapered portion 244 and is so provided that the refrigerant suction port 245a communicates with the refrigerant injection port of the tapered portion 244.

A space is formed between the inner circumferential surface of the body member 245 and the conical outer circumferential surface of the body portion 240 and between the inner circumferential surface of the body member 245 and the outer circumferential surface of the tapered portion. Because of the foregoing, the space functions as a drawn refrigerant passage for guiding drawn refrigerant drawn from the refrigerant suction port 245a into the body member 245 toward the diffuser portion 245b.

The diffuser portion 245b is placed on the downstream side of the refrigerant injection port of the tapered portion 244 and the refrigerant suction port 245a with respect to the flow of refrigerant. The diffuser portion 245b is formed in such a shape that the refrigerant passage area is gradually increased toward downstream. As a result, the diffuser portion 245b performs the following action: the action of reducing the velocity of flow of the mixed refrigerant of injected refrigerant injected from the refrigerant injection port of the tapered portion 244 and drawn refrigerant drawn from the refrigerant suction port 245a to increase the pressure thereof. That is, the diffuser portion 245b performs the action of converting the velocity energy of the mixed refrigerant into pressure energy.

As is apparent from the above description, in the refrigerant distributor 240 in this embodiment, it is possible to configure a Laval nozzle by the body portion 240 and the tapered portion 244. Since the refrigerant distributor 240 includes the body member 245, it is possible to carry out the functions of an ejector described in Patent Document 2 and the like by the entire refrigerant distributor 240.

A description will be given to the overall configuration of the two-stage pressure-increasing ejector refrigeration cycle device 300 in this embodiment with reference to FIG. 5 again. The refrigerant inflow port of a bifurcating portion 21 that bifurcates the flow of refrigerant is connected to the refrigerant outlet of the radiator 13 in this embodiment.

The bifurcating portion 21 is comprised of a three-way joint having three inflow/outflow ports and one of the inflow/outflow ports is used as a refrigerant inflow port and two are used as refrigerant outflow ports. The three-way joint may be configured by joining together pipes different in pipe diameter or may be configured by providing a metal block or a resin block with multiple refrigerant passages different in passage diameter.

The refrigerant inflow port 241 of the refrigerant distributor 24 is connected to one refrigerant outflow port of the bifurcating portion 21; and the suction-side evaporator 25 is connected to the other refrigerant outflow port through a fixed throttle 22 as a suction-side decompression portion. An orifice, a capillary tube, or the like can be adopted as the fixed throttle 22.

The suction-side evaporator 25 is a heat exchanger for heat absorption. The suction-side evaporator 25 causes low-pressure refrigerant depressurized at the fixed throttle 22 and blown air that is sent from the air blowing fan 15a and passed through the evaporator 15 to exchange heat therebetween. The suction-side evaporator 25 thereby evaporates and causes the low-pressure refrigerant to perform heat absorbing action. The basic configuration of the suction-side evaporator 25 is identical with that of the evaporator 15. The refrigerant suction port 245a of the refrigerant distributor 24 is connected to the refrigerant outlet side of the suction-side evaporator 25.

In the following description of this embodiment, the evaporator 15 will be referred to as outflow-side evaporator 15 to clarify the difference between the evaporator 15 and the suction-side evaporator 25. That is, the evaporator 15 in this embodiment corresponds to the outflow-side evaporator, for example.

The refrigerant inlet side of the outflow-side evaporator 15 is connected to the refrigerant outlet of the diffuser portion positioned on the downstream side of the first refrigerant outflow port 242 of the refrigerant distributor 24 with respect to the flow of refrigerant; and the suction side of the lower stage compressor 11 is connected to the refrigerant outlet side of the outflow-side evaporator 15. The suction side of the higher stage compressor 12 is connected to the second refrigerant outflow port 243 of the refrigerant distributor 24. The other configuration elements are the same as those in the first embodiment.

A description will be given to the operation of this embodiment configured as mentioned above. When the control device actuates the lower stage and higher stage compressors 11, 12 and the like as in the first embodiment, the following takes place: the high-temperature, high-pressure refrigerant discharged from the higher stage compressor 12 flows into the radiator 13 and is condensed there. At the bifurcating portion 21, the flow of high-pressure refrigerant flowing out of the radiator 13 is bifurcated into a flow into the refrigerant inflow port 241 of the refrigerant distributor 24 and a flow into the fixed throttle 22.

The high-pressure refrigerant flowing from the bifurcating portion 21 into the refrigerant distributor 24 swirls in the swirl space SS and flows out of the first and second refrigerant outflow ports 242, 243. At this time, the following takes place as in the first embodiment: refrigerant lower in vapor phase ratio flows out of the first refrigerant outflow port 242 and refrigerant higher in vapor phase ratio flows out of the second refrigerant outflow port 243.

When the refrigerant flowing out of the first refrigerant outflow port 242 passes through the first refrigerant outflow port 242, the pressure thereof is reduced. More specific description will be given. In the refrigerant distributor 24 in this embodiment, the Laval nozzle is comprised of the body portion 240, first refrigerant outflow port 242, and tapered portion 244. Therefore, the refrigerant passing through the first refrigerant outflow port 242 is isentropically depressurized and is injected from the refrigerant injection port of the tapered portion 244 at a velocity of flow higher than the acoustic velocity.

The refrigerant flowing out of the suction-side evaporator 25 is drawn from the refrigerant suction port 245a by the suction action of this injected refrigerant. The injected refrigerant injected from the tapered portion 244 and the drawn refrigerant drawn from the refrigerant suction port 245a flow into the diffuser portion 245b of the refrigerant distributor 24. In the diffuser portion 245b, the velocity energy of the refrigerant is converted into pressure energy by the expansion of the refrigerant passage area. As a result, the injected refrigerant and the drawn refrigerant are mixed and the pressure of the mixed refrigerant is increased.

The refrigerant that flowed out of the diffuser portion 245b flows into the outflow-side evaporator 15 and absorbs heat from blown air sent by the air blowing fan 15a and is evaporated. The blown air sent into the vehicle compartment is thereby cooled. The refrigerant that flowed out of the outflow-side evaporator 15 is drawn into the lower stage compressor 11 and compressed again.

When the refrigerant flowing out of the second refrigerant outflow port 243 passes through the second refrigerant outflow port 243, the pressure thereof is isenthalpically reduced until the refrigerant is turned into intermediate-pressure refrigerant. The refrigerant depressurized at the second refrigerant outflow port 243 is joined with refrigerant discharged from the lower stage compressor 11 and is drawn into the higher stage compressor 12.

The refrigerant that flowed out from the bifurcating portion 21 toward the fixed throttle 22 is isenthalpically depressurized and expanded at the fixed throttle 22 and flows into the suction-side evaporator 25. The refrigerant that flowed into the suction-side evaporator 25 absorbs heat from blown air sent by the air blowing fan 15a and cooled at the outflow-side evaporator 15 and is evaporated. The blown air sent into the vehicle compartment is thereby further cooled. The refrigerant that flowed out of the suction-side evaporator 25 is drawn from the refrigerant suction port 245a.

The refrigeration cycle device 300 in this embodiment operates as mentioned above. Therefore, it is possible to pass blown air sent from the air blowing fan 15a through the outflow-side evaporator 15 and the suction-side evaporator 25 in this order to cool the air. At this time, the following can be implemented: the pressure obtained after pressurization at the diffuser portion 245b is used as the refrigerant evaporation pressure of the outflow-side evaporator 15; and the lowest pressure obtained immediately after depressurization at the first refrigerant outflow port 242 is used as the refrigerant evaporation pressure of the suction-side evaporator 25.

Therefore, it is possible to make the refrigerant evaporation pressure (refrigerant evaporation temperature) of the suction-side evaporator 25 lower than the refrigerant evaporation pressure (refrigerant evaporation temperature) of the outflow-side evaporator 15. As a result, it is possible to ensure the temperature difference between the refrigerant evaporation temperatures of the outflow-side evaporator 15 and the suction-side evaporator 25 and the temperature of blown air to efficiently cool the blown air.

With the refrigeration cycle device 300 in this embodiment, not only the above-mentioned cycle efficiency enhancement effect of the economizer refrigeration cycle device and the above-mentioned cycle efficiency enhancement effect of the ejector refrigeration cycle device can be obtained. It is also possible to obtain the excellent effects described below as compared with two-stage pressure-increasing ejector refrigeration cycle devices of conventional technologies:

In the refrigeration cycle device 300 in this embodiment, the following can be implemented as in the first embodiment by swirling refrigerant in the swirl space SS of the refrigerant distributor 24: the refrigerant flowing out of the first refrigerant outflow port 242 can be brought into a state in which air bubbles are mixed in liquid-phase refrigerant.

As a result, boiling of refrigerant at the first refrigerant outflow port 242 comprising a throttle is accelerated. Thus it is possible to enhance the nozzle efficiency of the refrigerant distributor 24 that functions as an ejector and bring out stable suction capability and pressure increasing capability. Therefore, even when the heat load on the cycle fluctuates and the circulation flow rate of refrigerant circulating in the cycle is varied, the cycle efficiency enhancement effect of the ejector refrigeration cycle device can be obtained.

The following can be implemented as in the first embodiment by reducing the vapor phase ratio of refrigerant flowing into the outflow-side evaporator 15: it is possible to suppress pressure loss produced when the refrigerant passes through the outflow-side evaporator 15 and reduce driving power for the lower stage compressor 11 and the higher stage compressor 12.

Refrigerant is supplied from inside the swirl space SS of the refrigerant distributor 24 to the suction side of the higher stage compressor 12 through the second refrigerant outflow port 243 that functions as a throttle. Therefore, the refrigerant can be easily guided from the swirl space SS side where the pressure is high to the suction side of the higher stage compressor 12 where the pressure is low. As a result, it is also possible to suppress the inlet pressure loss of the higher stage compressor 12 to reduce driving power for the higher stage compressor 12.

In the refrigerant distributor 24 in this embodiment, the refrigerant passage that functions as a Laval nozzle is formed of the body portion 240, first refrigerant outflow port 24, and tapered portion 244. Then refrigerant is injected from the refrigerant injection port of the tapered portion 244 at a velocity of flow higher than the acoustic velocity. Therefore, even when the flow of refrigerant on the downstream side of the refrigerant distributor 24 is disturbed, the following can be implemented: it is possible to suppress the transmission of this disturbance in the flow of refrigerant on the downstream side to inside the swirl space SS through the first refrigerant outflow port 242.

Therefore, it is possible to stabilize the flow rate of refrigerant flowing out of the swirl space SS through the first and second refrigerant outflow ports 242, 243. Further, it is possible to reliably obtain the effect obtained by swirling the refrigerant at the following velocity of swirl flow in the swirl space SS: a velocity of swirl flow at which more vapor-phase refrigerant exists on the inner radius side of the swirl center line CL than on the outer radius side.

The cycle efficiency enhancement effect of the economizer refrigeration cycle device can also be obtained without fail by taking the following measure: the amount of depressurization of refrigerant at the second refrigerant outflow port 243 is appropriately adjusted to appropriately enhance the compression efficiencies of both the compression mechanisms 11, 12.

That is, with the refrigerant distributor 24 having the functions of an ejector in this embodiment, the following states can be appropriately made different from each other: the state of refrigerant supplied to a cycle component connected on the downstream side of the first refrigerant outflow port 242; and the state of refrigerant supplied to a cycle component connected on the downstream side of the second refrigerant outflow port 243. Thus it is possible to further enhance the cycle efficiency as compared with two-stage compression ejector refrigeration cycle devices of conventional technologies.

(Fourth Embodiment)

Figure 7:
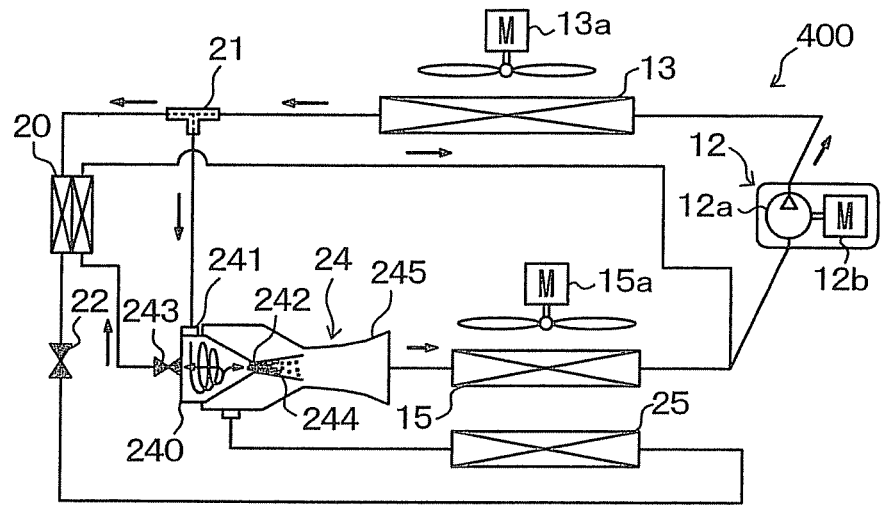
FIG. 7 is a schematic diagram showing a refrigeration cycle device according to a fourth embodiment of the present disclosure.

In the description of the above third embodiment, a case where the refrigerant distributor 24 is applied to the refrigeration cycle device 300 configured as a two-stage pressure-increasing ejector refrigeration cycle device has been taken as an example. In the description of a fourth embodiment, a case where the refrigerant distributor 24 is applied to an ejector refrigeration cycle device 400 provided with one compressor as illustrated in the schematic diagram in FIG. 7 will be taken as an example.

More specific description will be given. The refrigeration cycle device 400 in this embodiment has a configuration equivalent to a configuration in which of the two compressors 11, 12 in the third embodiment, the lower stage compressor 11 is disused. That is, the second refrigerant outflow port 243 of the refrigerant distributor 24 and the refrigerant outlet of the outflow-side evaporator 15 are both connected to the suction side of the higher stage compressor 12. In the description of this embodiment, consequently, the higher stage compressor 12 in the third embodiment is simply referred to as compressor 12 as in the description of the second embodiment.

The refrigeration cycle device 400 in this embodiment includes the same internal heat exchanger 20 as in the second embodiment. The internal heat exchanger 20 is so placed that heat is exchanged between the following: the refrigerant flowing out from the bifurcating portion 21 toward the fixed throttle 22 in the radiator 12 outflow refrigerant and the compressor 12 drawn refrigerant. The other configuration elements are the same as those in the third embodiment.

A description will be given to the operation of this embodiment configured as mentioned above. When the control device actuates the compressor 12, the high-temperature, high-pressure refrigerant discharged from the compressor 12 flows into the radiator 13 and is condensed there. The flow of high-pressure refrigerant flowing out of the radiator 13 is bifurcated at the bifurcating portion 21 into a flow into the refrigerant inflow port 241 of the refrigerant distributor 24 and a flow toward the fixed throttle 22.

The refrigerant that flowed from the bifurcating portion 21 into the refrigerant distributor 24 swirls in the swirl space SS and flows out of the first and second refrigerant outflow ports 242, 243 as in the third embodiment. The refrigerant flowing out of the first refrigerant outflow port 242 is isentropically depressurized, joined with refrigerant drawn from the refrigerant suction port 245a, and pressurized at the diffuser portion 245b as in the third embodiment.

The refrigerant flowing out of the diffuser portion 245b flows into the outflow-side evaporator 15 and absorbs heat from blown air sent by the air blowing fan 15a and is evaporated. The blown air sent into the vehicle compartment is thereby cooled.

When the refrigerant flowing out of the second refrigerant outflow port 243 passes through the second refrigerant outflow port 243, the pressure thereof is isenthalpically reduced. When the refrigerant depressurized at the second refrigerant outflow port 243 passes through the low pressure-side refrigerant pipe of the internal heat exchanger 20, as in the second embodiment, the following takes place: the refrigerant exchanges heat with refrigerant flowing out of the radiator 13 and the enthalpy thereof is increased until the refrigerant is turned into vapor-phase refrigerant. The refrigerant flowing out of the low pressure-side refrigerant pipe of the internal heat exchanger 20 is joined with refrigerant flowing out of the outflow-side evaporator 15 and is drawn into the compressor 12 and compressed again.

When the refrigerant flowing out of the bifurcating portion 21 toward the fixed throttle 22 passes through the high pressure-side refrigerant pipe of the internal heat exchanger 20, as in the second embodiment, the enthalpy thereof is further reduced. The refrigerant flowing out of the high pressure-side refrigerant pipe of the internal heat exchanger 20 is isenthalpically depressurized and expanded at the fixed throttle 22 and flows into the suction-side evaporator 25.

The refrigerant that flowed into the suction-side evaporator 25 absorbs heat from blown air sent by the air blowing fan 15a and cooled at the outflow-side evaporator 15 and is evaporated. The blown air sent into the vehicle compartment is thereby further cooled. The refrigerant that flowed out of the suction-side evaporator 25 is drawn from the refrigerant suction port 245a.

The refrigeration cycle device 400 in this embodiment operates as mentioned above. Therefore, it is possible to cause refrigerant to perform heat absorbing action both at the outflow-side evaporator 15 and at the suction-side evaporator 25 to efficiently cool blown air sent into the vehicle compartment. Since the refrigeration cycle device 400 in this embodiment is provided with the refrigerant distributor 24, it is possible to enhance the cycle efficiency as compared with ordinary refrigeration cycle devices of conventional technologies as in the third embodiment.

Specifically, it is possible to bring refrigerant flowing out of the first refrigerant outflow port 242 into a state in which air bubbles are mixed in liquid-phase refrigerant. As a result, boiling of refrigerant at the first refrigerant outflow port 242 comprising a throttle is accelerated. Thus it is possible to enhance the nozzle efficiency of the refrigerant distributor 24 that functions as an ejector and bring out stable suction capability and pressure increasing capability. As a result, it is possible to obtain the cycle efficiency enhancement effect of the ejector refrigeration cycle device without fail.

The following can be implemented by reducing the vapor phase ratio of refrigerant flowing into the outflow-side evaporator 15: it is possible to suppress pressure loss produced when the refrigerant passes through the outflow-side evaporator 15 and reduce driving power for the compressor 12. Refrigerant whose pressure is higher than the pressure of compressor 12 drawn refrigerant is supplied from inside the swirl space SS of the refrigerant distributor 24 to the suction side of the compressor 12. Therefore, it is possible to suppress the inlet pressure loss of the compressor 12 and reduce driving power for the compressor 12.

That is, with the refrigerant distributor 24 having the functions of an ejector in this embodiment, the following states can be suitably changed and can be made different from each other: the state of refrigerant supplied to a cycle component connected on the downstream side of the first refrigerant outflow port 242; and the state of refrigerant supplied to a cycle component connected on the downstream side of the second refrigerant outflow port 243. As a result, it is possible to further enhance the cycle efficiency as compared with ejector refrigeration cycle devices of conventional technologies.

(Fifth Embodiment)

Figure 8:
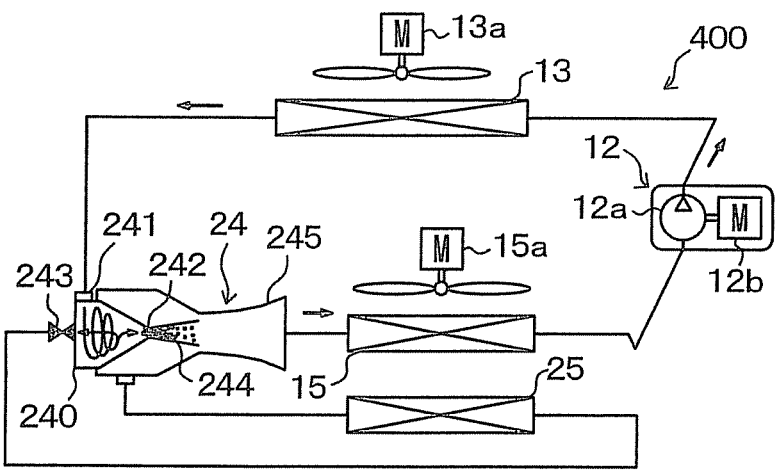
FIG. 8 is a schematic diagram showing a refrigeration cycle device according to a fifth embodiment of the present disclosure.
Figure 9:
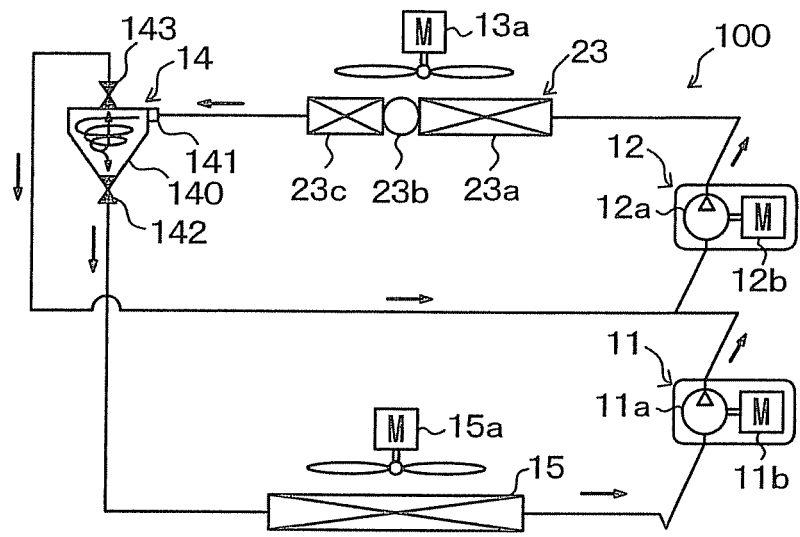
FIG. 9 is a schematic diagram showing a refrigeration cycle device according to a sixth embodiment of the present disclosure.

In the description of a fifth embodiment, a case where the following measure is taken in the refrigeration cycle device 400 in the fourth embodiment will be taken as an example: the bifurcating portion 21, fixed throttle 22, and internal heat exchanger 20 are disused and the mode in which the refrigerant distributor 24 and various cycle components are connected is modified. Specifically, the measure illustrated in the schematic diagram in FIG. 8 is taken. That is, the refrigerant inflow port 241 of the refrigerant distributor 24 is connected to the refrigerant outlet of the radiator 13 and the refrigerant inlet side of the suction-side evaporator 25 is connected to the second refrigerant outflow port of the refrigerant distributor 24.

The other configuration elements are the same as those in the fourth embodiment. Therefore, when the refrigeration cycle device 400 in this embodiment is actuated, the high-pressure supercooled liquid-phase refrigerant flowing out of the radiator 13 flows into the refrigerant distributor 24. The refrigerant swirls in the swirl space SS and flows out of the first and second refrigerant outflow ports 242, 243.

In the fifth embodiment, the swirl velocity of refrigerant swirling in the swirl space SS is reduced so that the following is implemented in contrast to the fourth embodiment: the vapor phase ratio of refrigerant flowing out of the first refrigerant outflow port 242 is increased and the vapor phase ratio of refrigerant flowing out of the second refrigerant outflow port 243 is reduced. As a result, when the refrigerant flowing out of the second refrigerant outflow port 243 is let to flow into the suction-side evaporator 25, the refrigerant can exert sufficient refrigeration capacity at the suction-side evaporator 25.

The refrigerant flowing out of the first refrigerant outflow port 242 flows exactly as in the fourth embodiment and performs heat absorbing action at the outflow-side evaporator 15 and is drawn into the compressor 12. When the refrigerant flowing out of the second refrigerant outflow port 243 passes through the second refrigerant outflow port 243, the pressure thereof is isenthalpically reduced until the refrigerant is turned into low-pressure refrigerant. Then the refrigerant performs heat absorbing action at the suction-side evaporator 25 and is drawn from the refrigerant suction port 245a.

The refrigeration cycle device 400 in this embodiment operates as mentioned above and the same effect as in the fourth embodiment can be obtained. That is, the following can be implemented even when the refrigerant distributor 24 having the functions of an ejector is used to configure an ejector refrigeration cycle device as in this embodiment: it is possible to further enhance the cycle efficiency as compared with ejector refrigeration cycle devices of conventional technologies.

With the cycle configuration in this embodiment, it is possible to disuse the bifurcating portion 21, the fixed throttle 22, and the like in the fourth embodiment. Therefore, it is possible to reduce the size and cost of the entire cycle.

(Sixth to 10th Embodiments)

Sixth to 10th embodiments will be respectively described with reference to FIGS. 9 to 13. The sixth embodiment is obtained by modifying the configuration of the radiator as illustrated in the schematic diagram in FIG. 9, in the refrigeration cycle device 100 configured as an economizer refrigeration cycle device in the first embodiment. Specifically, the sixth embodiment adopts a radiator 23 configured as a so-called subcool condenser as the radiator.

The radiator 23 is a so-called subcool condenser comprised of: a condensing portion 23a that causes high-pressure vapor-phase refrigerant discharged from the higher stage compressor 12 and outside air sent from the cooling fan 13a to exchange heat therebetween and radiates heat from the high-pressure vapor-phase refrigerant and condenses the refrigerant; a receiver portion 23b that separates refrigerant flowing out of the condensing portion 23a into vapor and liquid and stores the liquid-phase refrigerant; and a supercooling portion 23c that causes liquid-phase refrigerant flowing out of the receiver portion 23b and outside air sent from the cooling fan 13a to exchange heat therebetween and supercools the liquid-phase refrigerant.

Therefore, when the refrigeration cycle device 100 in the sixth embodiment is actuated, supercooled liquid-phase refrigerant flows from the supercooling portion 23c of the radiator 23 into the refrigerant distributor 14. At the refrigerant distributor 14, as described in relation to the first embodiment, the following can be implemented by swirling the refrigerant in the swirl space SS even when the refrigerant flowing in from the refrigerant inflow port 141 is supercooled liquid-phase refrigerant: it is possible to reduce the refrigerant pressure at the swirl center to boil the refrigerant under reduced pressure.

As a result, the following can be implemented as in the first embodiment even when the subcool radiator 23 is adopted as in this embodiment: it is possible to let refrigerant lower in vapor phase ratio flow out of the first refrigerant outflow port 142 of the refrigerant distributor 14 and let refrigerant higher in vapor phase ratio flow out of the second refrigerant outflow port 143. Therefore, exactly the same effect as in the first embodiment can be obtained.

The adoption of the radiator 23 reduces the enthalpy of refrigerant flowing into the refrigerant distributor 14. Therefore, it is possible to further reduce the enthalpy of refrigerant supplied from the first refrigerant outflow port 142 to the evaporator 15. As a result, the further cycle efficiency enhancement effect can be obtained.

Figure 10:
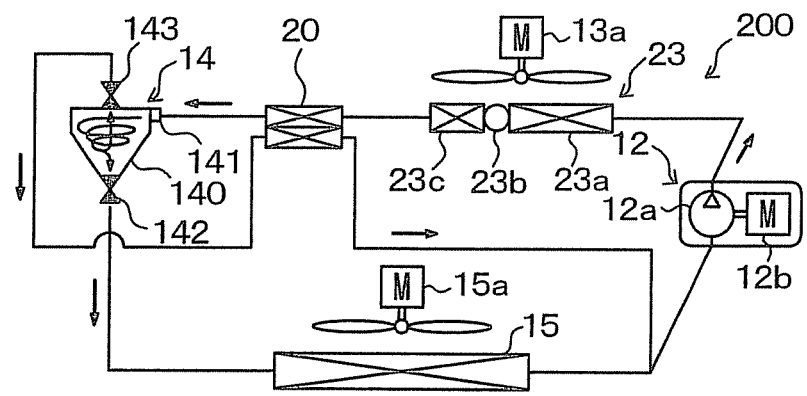
FIG. 10 is a schematic diagram showing a refrigeration cycle device according to a seventh embodiment of the present disclosure.

The seventh embodiment is configured by adopting the radiator 23 in the ordinary refrigeration cycle device 200 of the second embodiment, as illustrated in the schematic diagram in FIG. 10. In the seventh embodiment, exactly the same effect as in the second embodiment can be obtained and it is possible to obtain the cycle efficiency enhancement effect due to the further reduction of the enthalpy of refrigerant supplied to the evaporator 15.

Figure 11:
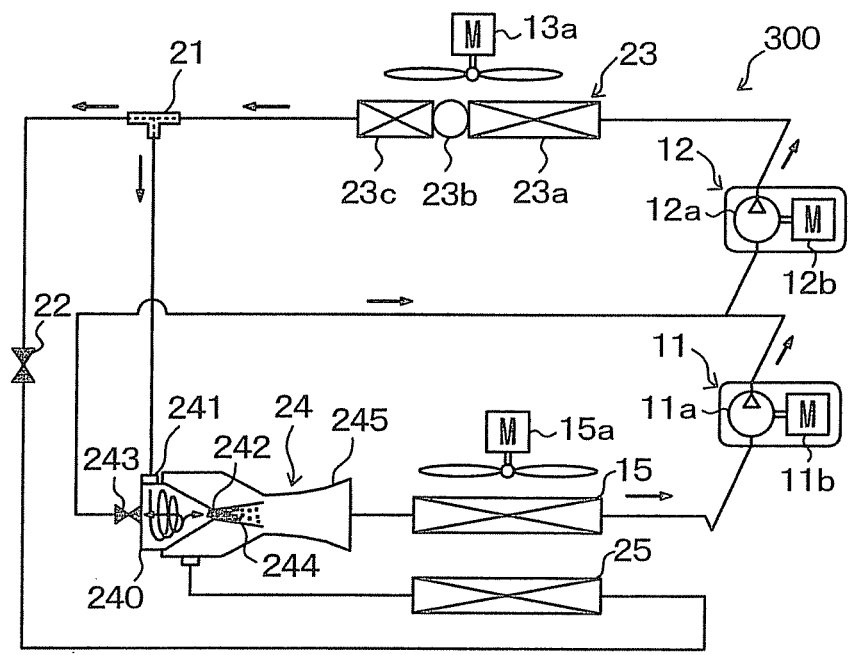
FIG. 11 is a schematic diagram showing a refrigeration cycle device according to an eighth embodiment of the present disclosure.

The eighth embodiment is configured by adopting the radiator 23 in the refrigeration cycle device 300 configured as a two-stage compression ejector refrigeration cycle device of the third embodiment, as illustrated in the schematic diagram in FIG. 11. In the eighth embodiment, exactly the same effect as in the third embodiment can be obtained. In addition, it is possible to obtain the cycle efficiency enhancement effect due to the further reduction of the enthalpy of refrigerant supplied to the outflow-side evaporator 15 and the suction-side evaporator 25.

Figure 12:
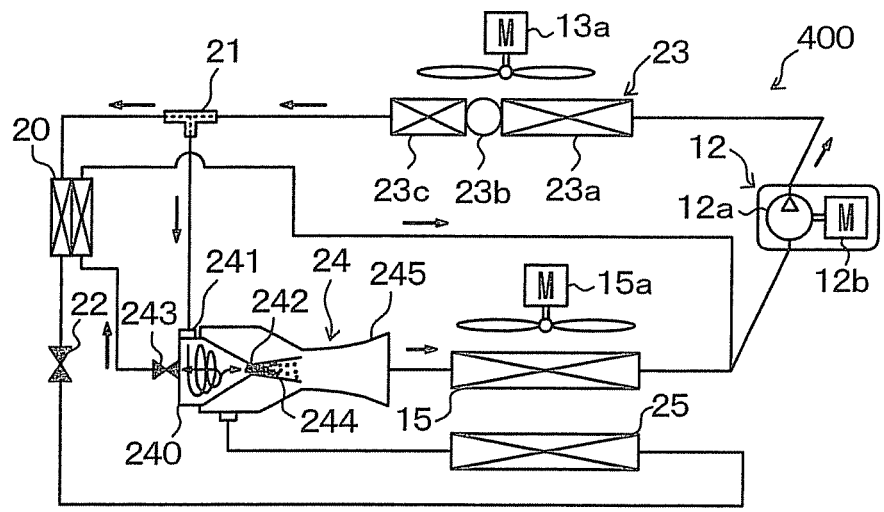
FIG. 12 is a schematic diagram showing a refrigeration cycle device according to a ninth embodiment of the present disclosure.

The ninth embodiment is configured by adopting the radiator 23 in the refrigeration cycle device 400 configured as an ejector refrigeration cycle device of the fourth embodiment, as illustrated in the schematic diagram in FIG. 12. In the ninth embodiment, exactly the same effect as in the fourth embodiment can be obtained. In addition, it is possible to obtain the cycle efficiency enhancement effect due to the further reduction of the enthalpy of refrigerant supplied to the outflow-side evaporator 15 and the suction-side evaporator 25.

Figure 13:
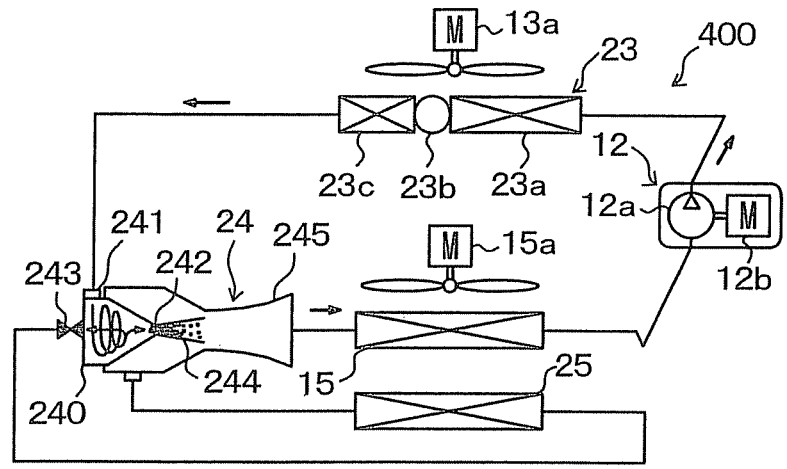
FIG. 13 is a schematic diagram showing a refrigeration cycle device according to a tenth embodiment of the present disclosure.
Figure 14:
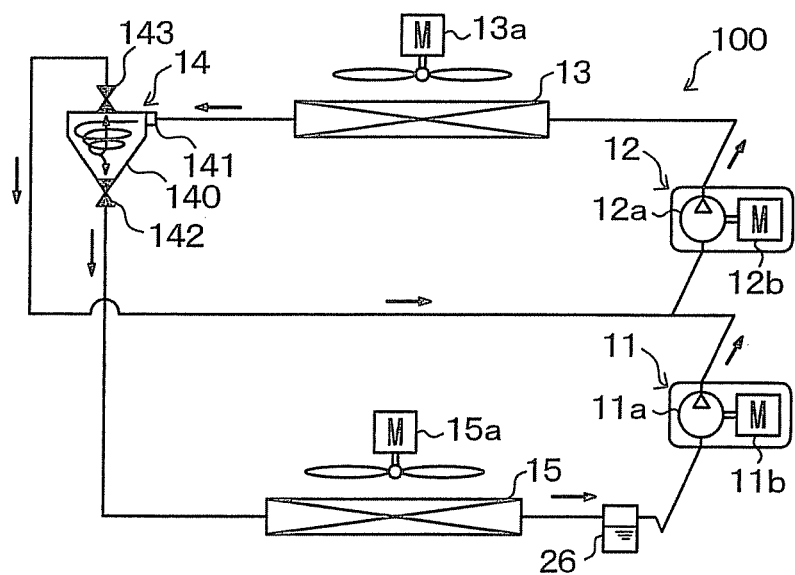
FIG. 14 is a schematic diagram showing a refrigeration cycle device according to an 11th embodiment of the present disclosure.

The 10th embodiment is configured by adopting the radiator 23 in the refrigeration cycle device 400 configured as an ejector refrigeration cycle device of the fifth embodiment as illustrated in the schematic diagram in FIG. 13. In the 10th embodiment, exactly the same effect as in the fifth embodiment can be obtained. In addition, it is possible to obtain the cycle efficiency enhancement effect due to the further reduction of the enthalpy of refrigerant supplied to the outflow-side evaporator 15 and the suction-side evaporator 25.

(11th to 15th Embodiments)

11th to 15th embodiments will be described respectively with reference to FIGS. 14 to 18. The 11th embodiment is obtained by adding an accumulator 26 to the refrigeration cycle device 100 configured as an economizer refrigeration cycle device of the first embodiment, as illustrated in the schematic diagram in FIG. 14. The accumulator 26 is disposed at a downstream refrigerant side of the evaporator 15 to separate refrigerant drawn into the lower stage compressor 11 into vapor and liquid and to store the liquid-phase refrigerant. The other configuration elements and operation are the same as those in the first embodiment. Therefore, also in the refrigeration cycle device 100 in the 11th embodiment, the same effect as in the first embodiment can be obtained.

In the cycle equipped with this accumulator 26, it is possible to reliably supply vapor-phase refrigerant to the suction side of the lower stage compressor 11 to prevent the liquid compression of the lower stage compressor 11. Therefore, it is possible to control the operation of the lower stage compressor 11 and the higher stage compressor 12 so that the cycle efficiency is maximized according to the temperature or pressure of refrigerant flowing out of the radiator 13. As a result, the further cycle efficiency enhancement effect can be obtained.

Figure 15:
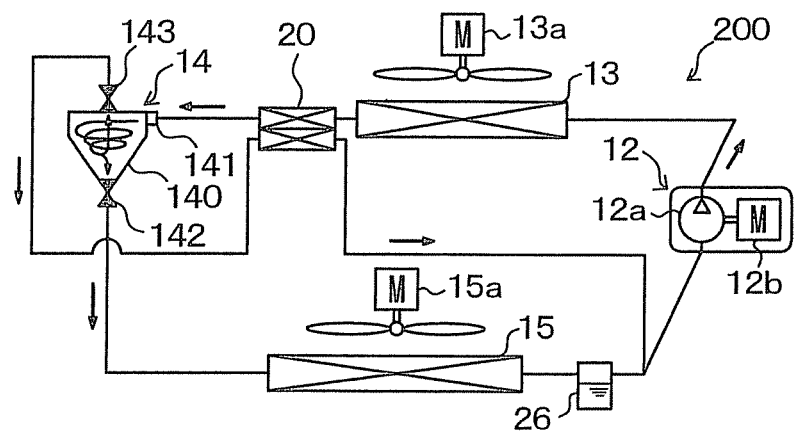
FIG. 15 is a schematic diagram showing a refrigeration cycle device according to a 12th embodiment of the present disclosure.

The 12th embodiment is obtained by adding an accumulator 26 to the refrigeration cycle device 200 in the second embodiment, as illustrated in the schematic diagram in FIG. 15. The accumulator 26 is disposed at a downstream refrigerant side of the evaporator 15 to separate refrigerant drawn into the compressor 12 into vapor and liquid and to store the liquid-phase refrigerant. The other configuration elements and operation are the same as those in the second embodiment. Therefore, also in the refrigeration cycle device 200 in the 12th embodiment, the same effect as in the second embodiment can be obtained and the further cycle efficiency enhancement effect can be obtained.

Figure 16:
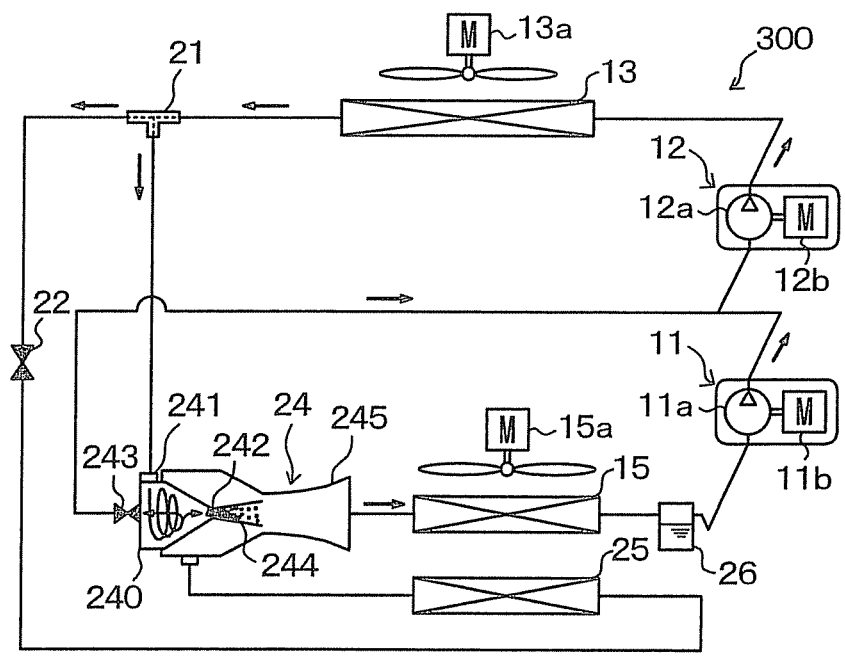
FIG. 16 is a schematic diagram showing a refrigeration cycle device according to a 13th embodiment of the present disclosure.

The 13th embodiment is obtained by adding an accumulator 26 to the refrigeration cycle device 300 of the third embodiment, as illustrated in the schematic diagram in FIG. 16. The accumulator 26 is disposed at a downstream refrigerant side of the outflow-side evaporator 15 to separate refrigerant drawn into the lower stage compressor 11 into vapor and liquid and to store the liquid-phase refrigerant. The other configuration elements and operation are the same as those in the third embodiment. Therefore, also in the refrigeration cycle device 300 in the 13th embodiment, the same effect as in the third embodiment can be obtained and the further cycle efficiency enhancement effect can be obtained.

Figure 17:
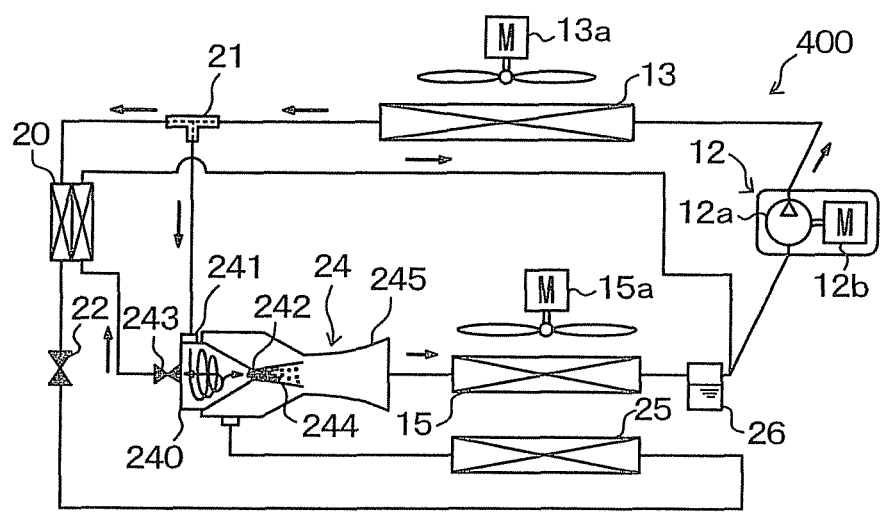
FIG. 17 is a schematic diagram showing a refrigeration cycle device according to a 14th embodiment of the present disclosure.

The 14th embodiment is obtained by adding an accumulator to the refrigeration cycle device 400 of the fourth embodiment, as illustrated in the schematic diagram in FIG. 17. The accumulator 26 is disposed at a downstream refrigerant side of the outflow-side evaporator 15 to separate refrigerant drawn into the compressor 12 into vapor and liquid and to store the liquid-phase refrigerant. The other configuration elements and operation are the same as those in the fourth embodiment. Therefore, also in the refrigeration cycle device 400 in the 14th embodiment, the same effect as in the fourth embodiment can be obtained and the further cycle efficiency enhancement effect can be obtained.

Figure 18:
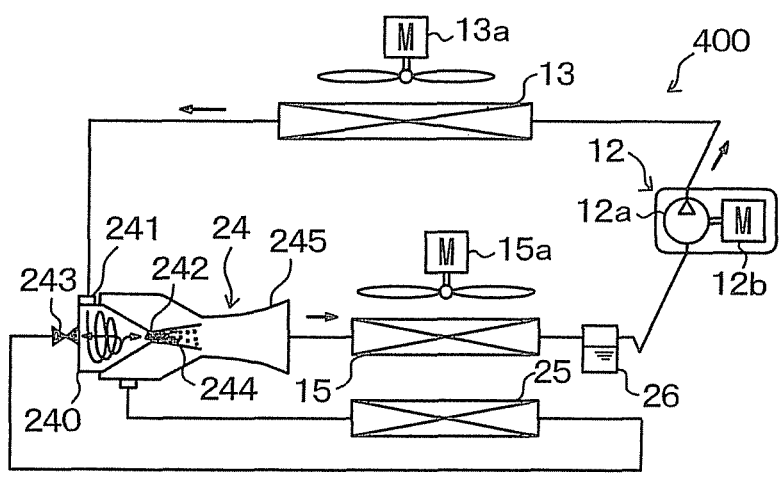
FIG. 18 is a schematic diagram showing a refrigeration cycle device according to a 15th embodiment of the present disclosure.

The 15th embodiment is obtained by adding an accumulator 26 to the refrigeration cycle device 400 of the fifth embodiment, as illustrated in the schematic diagram in FIG. 18. The accumulator 26 is disposed at a downstream refrigerant side of the outflow-side evaporator 15 to separate refrigerant drawn into the compressor 12 into vapor and liquid and to store the liquid-phase refrigerant. The other configuration elements and operation are the same as those in the fifth embodiment. Therefore, also in the refrigeration cycle device 400 in the 15th embodiment, the same effect as in the fifth embodiment can be obtained and the further cycle efficiency enhancement effect can be obtained.

The above-mentioned accumulator 26 may be applied to the refrigeration cycle devices 100 to 400 in the sixth to 10th embodiments.

(Other Embodiments)

The present disclosure is not limited to the above-mentioned embodiments and can be variously modified without departing from the subject matter of the present disclosure as described below.

(1) In the above-described embodiments, a case where the swirl space SS in the refrigerant distributor 14, 24 is in such a shape as is obtained by coaxially joining together a columnar space and a conical shape have been taken as an example. However, the spatial shape of the swirl space SS is not limited to the foregoing. For example, the sectional shape perpendicular to the following direction in the refrigerant distributor 14 in the first embodiment may be oval or polygonal: the direction in which the central part of the first refrigerant outflow port 142 and the central part of the second refrigerant outflow port 143 are connected together.

In this case, the swirl center line CL does not agree with the axis of the swirl space SS. The following only has to be implemented under the operating conditions ordinarily assumed for the refrigeration cycle devices 100 to 400: the first refrigerant outflow port 142, 242 is placed on the extended line of the swirl center line CL on the one end side; and the second refrigerant outflow port 143, 243 is placed on the extended line of the swirl center line CL on the other end side.

For this reason, Formula F2 mentioned above is adopted as an index for indicating the distance between the swirl center and the outermost radius side of swirl flow. That is, according to Formula F2, a condition for sufficiently growing the swirl flow of refrigerant swirling in the swirl space SS can be derived even when the following sectional shape is oval or polygonal: the sectional shape perpendicular to the direction in which the central part of the first refrigerant outflow port 142 and the central part of the second refrigerant outflow port 143 are connected together.

(2) In each embodiment mentioned above, the functions of a fixed throttle similar to an orifice are carried out by reducing the refrigerant passage area of each of the first and second refrigerant outflow ports 142, 143, 242, 243. The means for causing the first and second refrigerant outflow ports 142, 143, 242, 243 to carry out the functions of a throttle is not limited to the foregoing. For example, the second refrigerant outflow port 143, 243 of the refrigerant distributor 14, 24 may be comprised of a capillary tube.

In each embodiment mentioned above, each of the first and second refrigerant outflow ports 142, 143, 242, 243 is configured as a fixed throttle whose refrigerant passage area is fixed. Needless to add, each of the first and second refrigerant outflow ports 142, 143, 242, 243 may be configured as a variable throttle whose refrigerant passage area is variable. For example, a variable throttle may be configured by providing the following in the refrigerant passage of the refrigerant distributor 24 that functions as a Laval nozzle: a needle valve that varies the refrigerant passage area of the first refrigerant outflow port 142, 242 having a throat portion; and an electric actuator that displaces the needle valve.

(3) In the first, third, sixth, eighth and 11th embodiments mentioned above, cases where two compressors, the lower stage compressor 11 and the higher stage compressor 12, are adopted to pressurize refrigerant in multiple stages have been taken as examples. However, the compressor is not limited to the foregoing. For example, a compressor configured by housing two compression mechanisms (a lower stage compression mechanism 11a and a higher stage compression mechanism 12a) in one housing may be adopted.

A compressor obtained by housing one compression mechanism in one housing and providing an intermediate pressure port for introducing intermediate-pressure refrigerant at some midpoint in the compression stroke of the compression mechanism may be adopted. In this case, of the compression mechanism, the range extended from the suction port to the intermediate pressure port functions as the lower stage compression mechanism 11a; and the range extended from the intermediate pressure port to the discharge port provides the higher stage compression mechanism 12a.

(4) In the first, second, sixth, seventh, 11th, and 12th embodiments mentioned above, the vertical direction is taken as the following direction: the direction in which the central part of the first refrigerant outflow port 142 of the refrigerant distributor 14 and the central part of the second refrigerant outflow port 143 thereof are connected together. However, the direction in which the central part of the first refrigerant outflow port 142 and the central part of the second refrigerant outflow port 143 are connected together is not limited to the foregoing.

That is, the following can be implemented as long as the first refrigerant outflow port 142 is placed below the second refrigerant outflow port 143: the vapor phase ratio of refrigerant flowing out of the first refrigerant outflow port 142 can be made lower than the vapor phase ratio of refrigerant flowing out of the second refrigerant outflow port 143 by utilizing the action of gravity. The foregoing can be implemented even when the direction in which the central part of the first refrigerant outflow port 142 and the central part of the second refrigerant outflow port 143 are connected together is inclined from the vertical direction.

The direction in which the central part of the first refrigerant outflow port and the central part of the second refrigerant outflow port are connected together may be horizontal as in the third to fifth and eighth to 10th embodiments. In this case, the following conditions must be met: it must be possible to sufficiently increase the velocity of swirl flow of refrigerant swirling in the swirl space SS; and it must be possible to thereby make the vapor phase ratio of refrigerant flowing out of the first refrigerant outflow port and the vapor phase ratio of refrigerant flowing out of the second refrigerant outflow port respectively change and different from each other.

(5) In the above description of the refrigeration cycle device 200, 400 in each of the second, fourth, seventh, ninth, and 12th embodiments, a case where the internal heat exchanger 20 is adopted have been taken as an example. Needless to add, an internal heat exchanger may be applied to the refrigeration cycle device 100, 300 in each of the first, third to sixth, eighth, 10th, and 11th embodiments. For example, when the internal heat exchanger is applied to the refrigeration cycle device 100 in the first, sixth, or 11th embodiment, heat exchange only has to be carried out between the following: the refrigerant flowing out of the radiator 13, 23 and the refrigerant drawn to the lower stage compressor 11 or the higher stage compressor 12.

When the internal heat exchanger is applied to the refrigeration cycle device 300 in the third or eighth embodiment, heat exchange is carried out between the following: the refrigerant flowing from the bifurcating portion 21 toward the fixed throttle 22 in the refrigerant flowing out of the radiator 13, and the refrigerant drawn into the lower stage compressor 11 or drawn into the higher stage compressor 12. When the internal heat exchanger is applied to the refrigeration cycle device 400 in the fifth or 10th embodiment, heat exchange only has to be carried out between the refrigerant flowing out of the radiator 13 and the refrigerant to be drawn to the compressor 12.

With respect to the above-mentioned embodiments, a concrete description has not been given to the configuration of the internal heat exchanger 20. For example, specifically, a double pipe heat exchanger configuration or the like in which the following measure is taken can be adopted as the configuration of the internal heat exchanger 20: a low pressure-side refrigerant pipe for circulating low-pressure refrigerant or intermediate-pressure refrigerant is placed inside a high pressure-side refrigerant pipe for circulating high-pressure refrigerant. Needless to add, the inner pipe may be used as the high pressure-side refrigerant pipe and the outer pipe may be used as the low pressure-side refrigerant pipe. A configuration or the like in which a high pressure-side refrigerant pipe and a low pressure-side refrigerant pipe are joined together to exchange heat may be adopted.

(6) In the above description of each of the third, fourth, eighth, and ninth embodiments, a configuration in which the following measure is taken has been taken as an example of the configuration thereof: the bifurcating portion 21 for bifurcating the flow of refrigerant flowing out of the radiator 13, 23 is provided; and the refrigerant inflow port 241 of the refrigerant distributor 24 that functions as an ejector is connected to the outlet for one flow of refrigerant bifurcated at the bifurcating portion 21. However, the ejector refrigeration cycle device configured using the refrigerant distributor 24 is not limited to the foregoing.

For example, a cycle configuration including a low pressure-side bifurcating portion for bifurcating the flow of refrigerant flowing out of the diffuser portion 245*b* of the refrigerant distributor 24 may be adopted. In this case, one flow of refrigerant bifurcated at the low pressure-side bifurcating portion is directed to the outflow-side evaporator 15 and the other flow of refrigerant is directed to the suction-side evaporator 25.

(7) In the third to fifth and eighth to 10th embodiments mentioned above, an identical space to be cooled (the interior of a vehicle compartment) is cooled with the outflow-side evaporator 15 and the suction-side evaporator 25. Instead, different spaces to be cooled may be cooled with the outflow-side evaporator 15 and the suction-side evaporator 25. For example, the suction-side evaporator 25 lower in refrigerant evaporation pressure (refrigerant evaporation temperature) than the outflow-side evaporator 15 is utilized to cool the interior of a freezer and the outflow-side evaporator 15 is utilized to cool the interior of a refrigerator.

(8) In the above description of each embodiment, a case where the refrigeration cycle device 100 to 400 including the refrigerant distributor 14, 24 of the present disclosure is applied to an air conditioner for vehicles have been taken as an example. The application of the refrigeration cycle device 100 to 400 including the refrigerant distributor 14, 24 of the present disclosure is not limited to the foregoing. For example, the refrigeration cycle device may be applied to a stationary air conditioner, a cool-temperature storage, a cooling/heating device for vending machines, or the like.

(9) In the above description of each embodiment, a case where the following is implemented has been taken as an example: the radiator 13, 23 is used as an outdoor heat exchanger for heat exchange between refrigerant and the outside air; and the evaporator (outflow-side evaporator) 15 and the suction-side evaporator 25 are used as a utilization-side heat exchanger for cooling indoor blown air. Instead, a heat pump cycle in which the following is implemented may be configured: the evaporator (outflow-side evaporator) 15 and the suction-side evaporator 25 are used as an outdoor heat exchanger for absorbing heat from a heat source, such as the outside air, and the radiator 13, 23 is used as an indoor heat exchanger for heating a fluid, such as air or water, to be heated.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

According to exemplary aspects of the above-described embodiments, a refrigerant distributor 14, 24 for a refrigeration cycle device includes a body portion 140, 240 defining a swirl space SS configured to swirl a refrigerant, a refrigerant inflow port 141, 241 from which the refrigerant flows into the swirl space SS, and first and second refrigerant outflow ports 142, 143, 242, 243 which causes the refrigerant in the swirl space SS to flow out and distributes the refrigerant to components of the refrigeration cycle device connected to the first and second refrigerant outflow ports 142, 143, 242, 243. When a line connecting swirl centers of refrigerant swirling in the swirl space SS is taken as a swirl center line CL, the refrigerant swirls in the swirl space SS at such a velocity of a swirl flow that more vapor-phase refrigerant exists on an inner radius side than on an outer radius side and the velocity of swirl flow on the swirl center line CL at one end side and the velocity of swirl flow on the swirl center line CL at the other side are different from each other. Furthermore, the first refrigerant outflow port 142, 242 is arranged on an extended line of the swirl center line CL at the one end side, and the second refrigerant outflow port 143, 243 is arranged on the extended line of the swirl center line CL at the other end side.

Accordingly, the refrigerant introduced into the swirl space SS is swirled at such a velocity of swirl flow that more vapor-phase refrigerant exists on the inner radius side than on the outer radius side of the swirl center line CL. Therefore, the pressure of refrigerant that is higher in vapor phase ratio on the inner radius side can be made lower than the pressure of refrigerant on the outer radius side of the swirl center line CL.

Furthermore, the first and second refrigerant outflow ports 142, 143, 242, 243 are arranged on the extended line of the swirl center line CL. Therefore, the following refrigerant can be let to flow out from the first and second refrigerant outflow ports 142, 143, 242, 243: refrigerant of high vapor-phase ratio, lower in pressure than refrigerant that flows at the outer radius side of the swirl center line CL, that is, than the refrigerant that flows from the refrigerant inflow port 141, 241 into the swirl space SS.

The velocity of swirl flow on the one end side of the swirl center line CL and the velocity of swirl flow on the other end side of the swirl center line CL are different from each other. Therefore, the vapor phase ratio of refrigerant flowing out of the first refrigerant outflow port 142, 242 placed on the extended line of the swirl center line CL on the one end side can be made different from the vapor phase ratio of refrigerant flowing out of the second refrigerant outflow port 143, 243 placed on the extended line of the swirl center line CL on the other end side.

Thus, it is possible to make different from each other, for the state of refrigerant supplied to a cycle component connected to the first refrigerant outflow port 142, 242 and the state of refrigerant supplied to a cycle component connected to the second refrigerant outflow port 143, 243. As a result, it is possible to provide a refrigerant distributor 14, 24 capable of appropriately adjusting the state of refrigerant supplied to respective cycle components and distributing the refrigerant to enhance cycle efficiency.

In the above-described embodiments and the following embodiments, the velocity of swirl flow on the one end side of the swirl center line CL and the velocity of swirl flow on the other end side of the swirl center line CL are different from each other. Therefore, the vapor phase ratio of refrigerant flowing out of the first refrigerant outflow port 142, 242 placed on the extended line of the swirl center line CL on the one end side can be made different from the vapor phase ratio of refrigerant flowing out of the second refrigerant outflow port 143, 243 placed on the extended line of the swirl center line CL on the other end side.

Thus, it is possible to make different from each other, for the state of refrigerant supplied to a cycle component connected to the first refrigerant outflow port 142, 242 and the state of refrigerant supplied to a cycle component connected to the second refrigerant outflow port 143, 243. As a result, it is possible for the refrigerant distributor 14, 24 to be capable of appropriately adjusting the state of refrigerant supplied to respective cycle components and distributing the refrigerant to enhance cycle efficiency.

The swirl center line CL needs not be linearly formed. The swirl center line CL also includes swirl center lines formed as curved lines depending on the shape of the swirl space or the velocity of swirl flow of refrigerant swirling in the swirl space SS.

The swirl center is a place where the pressure of refrigerant is lowest. Therefore, the swirl center line CL can also be expressed as the following line: the line connecting the points at which the pressure is lowest in each section perpendicular to the direction in which the first refrigerant outflow port 142, 242 and the second refrigerant outflow port 143, 243 are connected together among the sections in the swirl space SS.

The velocity of swirl flow means the velocity of flow of a component of refrigerant in the swirl direction at a predetermined point in a section perpendicular to the swirl center line CL. For example, the velocity of flow in the swirl direction of refrigerant on the outermost radius side in the swirl space SS can be adopted. Therefore, the velocity of swirl flow varies depending on the cross-sectional shape of or a difference in the sectional area of the swirl space SS or the like.

The vapor-phase refrigerant includes both of vapor-phase refrigerant that flowed in from the refrigerant inflow port 141, 241 and vapor-phase refrigerant produced in the swirl space SS. That is, when the refrigerant flowing in from the refrigerant inflow port 141, 241 is liquid-phase refrigerant, the above vapor-phase refrigerant is vapor-phase refrigerant produced by reduced-pressure boiling (cavitation) in the swirl space SS. When the refrigerant flowing in from the refrigerant inflow port 141, 241 is vapor-liquid two-phase refrigerant, the above vapor-phase refrigerant includes not only vapor-phase refrigerant produced by reduced-pressure boiling but also vapor-phase refrigerant flowing in from the refrigerant inflow port 141, 241.

The swirl space SS may include a tapered space having a sectional area perpendicular to a direction in which the first refrigerant outflow port 142, 242 and the second refrigerant outflow port 143, 243 are connected together, and the sectional area of the tapered space in the swirl space SS is gradually reduced toward one of the first and second refrigerant outflow ports 142, 143, 242, 243. The refrigerant distributor 14, 24 may further include a tapered portion 244 connected to the first refrigerant outflow port 242, and a body member 245. The tapered portion 244 has therein a refrigerant passage area gradually enlarged toward a refrigerant downstream side. The body member 245 may include a refrigerant suction port 245a from which refrigerant is drawn by a jet flow of the refrigerant injected from the tapered portion 244 and a diffuser portion 245b for increasing a pressure of mixed refrigerant of the refrigerant injected from the tapered portion 244 and the refrigerant drawn from the refrigerant suction port 245a. The first refrigerant outflow port 242 may be configured to have a throttle that reduces a refrigerant passage area to decompress the refrigerant.

The first and second refrigerant outflow ports 142, 143, 242, 243 may be configured to reduce the refrigerant passage area so as to decompress the refrigerant, and at least one of the first refrigerant outflow port 142, 242 and the second refrigerant outflow port 143, 243 may be configured to have a fixed throttle in which the refrigerant passage area is fixed and throttled.

The refrigerant distributor 14, 24 can be suitably used for a refrigeration cycle device. For example, the refrigeration cycle device may include a lower stage compression mechanism 11 configured to compress low-pressure refrigerant until the refrigerant is turned into intermediate-pressure refrigerant and to discharge the intermediate-pressure refrigerant, a higher stage compression mechanism 12 configured to compress the intermediate-pressure refrigerant discharged from the lower stage compression mechanism 11 until the refrigerant is turned into high-pressure refrigerant and to discharge the high-pressure refrigerant, a radiator 13, 23 configured to radiate heat from the refrigerant flowing out of the higher stage compression mechanism, a refrigerant distributor 14, 24 having a refrigerant inflow port 141, 241 from which the refrigerant from the radiator 13, 23 is introduced therein and first and second refrigerant outflow ports 42, 143, 242, 243 from which the refrigerant flows out, and an evaporator 15 disposed to evaporate refrigerant at a refrigerant downstream side of the first refrigerant outflow port 142, 242 and letting the refrigerant flow out to a suction side of the lower stage compression mechanism 11. Even in this case, the refrigerant distributor 14, 24 may include a body portion 140, 240 defining a swirl space SS in which the refrigerant flowing from the refrigerant inflow port 141, 241 is swirled. When the line connecting the swirl centers of refrigerant swirling in the swirl space SS is taken as swirl center line CL, the refrigerant in the swirl space SS swirls at such a velocity of swirl flow that more vapor-phase refrigerant exists on an inner radius side than on an outer radius side and the velocity of swirl flow on the swirl center line CL at one end side and the velocity of swirl flow on the swirl center line CL at the other end side are different from each other. The swirl space SS may be configured such that a vapor phase ratio of the refrigerant at the other end side in the swirl space SS is higher than the vapor phase ratio at the one end side in the swirl space SS, the first refrigerant outflow port 142, 242 may be configured to reduce a refrigerant passage area so as to decompress refrigerant and may be arranged on an extended line of the swirl center line CL at the one end side. Furthermore, the second refrigerant outflow port 143, 243 may be configured to reduce a refrigerant passage area so as to decompress refrigerant and may be arranged on the extended line of the swirl center line CL at the other end side, and the second refrigerant outflow port 143, 243 may be coupled to a suction side of the higher stage compression mechanism 12.

Alternatively, the refrigeration cycle device may include a compressor 12 configured to compress a refrigerant, a radiator 13, 23 configured to radiate heat from the refrigerant flowing out of the compressor, a refrigerant distributor 141, 241 causing the refrigerant flowing out of the radiator to flow thereinto from a refrigerant inflow port 141, 241 and causing the refrigerant to flow out of first and second refrigerant outflow ports 142, 143, 242, 243, and an evaporator 15 disposed to evaporate refrigerant at a refrigerant downstream side of the first refrigerant outflow port 142, 242 and letting the refrigerant flow out to a suction side of the compressor 12. Even in this case, the refrigerant distributor 14, 24 may include a body portion 140, 240 defining a swirl space SS in which the refrigerant flowing from the refrigerant inflow port 141, 241 is swirled. When the line connecting the swirl centers of refrigerant swirling in the swirl space SS is taken as swirl center line CL, the refrigerant in the swirl space SS swirls at such a velocity of swirl flow that more vapor-phase refrigerant exists on an inner radius side than on an outer radius side and the velocity of swirl flow on the swirl center line at one end side and the velocity of swirl flow on the swirl center line at the other end side are different from each other. The swirl space SS may be configured such that a vapor phase ratio of the refrigerant at the other end side in the swirl space SS is higher than the vapor phase ratio at the one end side in the swirl space SS, and the first refrigerant outflow port 142, 242 may be configured to reduce a refrigerant passage area so as to decompress refrigerant and may be arranged on an extended line of the swirl center line CL at the one end side. The second refrigerant outflow port 143, 243 may be configured to reduce a refrigerant passage area so as to decompress refrigerant and may be arranged on the extended line of the swirl center line CL at the other end side, and the second refrigerant outflow port 143, 243 may be coupled to a suction side of the compressor 12.

Alternatively, the refrigeration cycle device may include a lower stage compression mechanism 11 configured to compress a low-pressure refrigerant until the refrigerant is turned into intermediate-pressure refrigerant, and to discharge the intermediate-pressure refrigerant, a higher stage compression mechanism 12 configured to compress the intermediate-pressure refrigerant discharged from the lower stage compression mechanism until the refrigerant is turned in high-pressure refrigerant and to discharge the high-pressure refrigerant, a radiator 13, 23 configured to radiate heat from the high-pressure refrigerant discharged from the higher stage compression mechanism 12, a bifurcating portion 21 bifurcating a flow of refrigerant flowing out of the radiator 13, 23 into a first stream and a second stream, a refrigerant distributor 24 having a refrigerant inflow port 241 from which the refrigerant of the first stream bifurcated at the bifurcating portion 21 is introduced and first and second refrigerant outflow ports 242, 243 from which the refrigerant flows out, an outflow-side evaporator 15 disposed to evaporate the refrigerant at a refrigerant downstream side of the first refrigerant outflow port 242 and letting the refrigerant flow out to a suction side of the lower stage compression mechanism, a suction-side decompression portion 22 configured to decompress the refrigerant of the second stream bifurcated at the bifurcating portion 21, and a suction-side evaporator 25 disposed to evaporate the refrigerant decompressed by the suction-side decompression portion 22. Even in this case, the refrigerant distributor 24 may include a body portion defining a swirl space SS for swirling the refrigerant flowing from the refrigerant inflow port 241. When a line connecting the swirl centers of refrigerant swirling in the swirl space SS is taken as swirl center line CL, the refrigerant swirls in the swirl space SS at such a velocity of swirl flow that more vapor-phase refrigerant exists on an inner radius side than on an outer radius side and the velocity of swirl flow on the swirl center line CL at one end side and the velocity of swirl flow on the swirl center line CL at the other end side are different from each other. Furthermore, the swirl space SS may be configured such that a vapor phase ratio of the refrigerant in the swirl space SS on the other end side is higher than a vapor phase ratio in the swirl space SS on the one end side, the first refrigerant outflow port may be configured to reduce a refrigerant passage area so as to decompress refrigerant and may be arranged on an extended line of the swirl center line CL at the one end side, and the second refrigerant outflow port 243 may be configured to reduce a refrigerant passage area so as to decompress refrigerant and may be arranged on the extended line of the swirl center line CL at the other end side. The refrigerant distributor 24 may include a tapered portion 244 connected to the first refrigerant outflow port 242, and a body member 245. The tapered portion 244 may have therein a refrigerant passage area gradually enlarged toward a refrigerant downstream side. The body member 245 may include a refrigerant suction port 245a from which refrigerant is drawn by a jet flow of the refrigerant injected from the tapered portion 244, and a diffuser portion 245b for increasing a pressure of mixed refrigerant of the refrigerant injected from the tapered portion 244 and the refrigerant drawn from the refrigerant suction port 245a. In this case, a refrigerant outlet side of the suction-side evaporator 25 may be coupled to the refrigerant suction port 245a of the body member 245, and the second refrigerant outflow port 243 may be coupled to a suction side of the higher stage compression mechanism 12.

Alternatively, the refrigeration cycle device may include a compressor 12 configured to compress refrigerant, a radiator 13, 23 configured to radiate heat from the refrigerant discharged from the compressor 12, a bifurcating portion 21 bifurcating a flow of refrigerant flowing out of the radiator 13, 23 into a first stream and a second stream, a refrigerant distributor 24 having a refrigerant inflow port 241 from which the refrigerant of the first stream bifurcated at the bifurcating portion 21 is introduced, and first and second refrigerant outflow ports 242, 243 from which the refrigerant flows out, an outflow-side evaporator 15 disposed to evaporate the refrigerant at a refrigerant downstream side of the first refrigerant outflow port 242 and letting the refrigerant flow out to a suction side of the compressor 12, a suction-side decompression portion 22 configured to decompress the refrigerant of the second stream bifurcated at the bifurcating portion, and a suction-side evaporator 25 connected to the suction-side decompression portion to evaporate the refrigerant decompressed by the suction-side decompression portion 22. Even in this case, the refrigerant distributor 24 may include a body portion defining a swirl space SS for swirling the refrigerant flowing from the refrigerant inflow port 241. When a line connecting the swirl centers of refrigerant swirling in the swirl space SS is taken as swirl center line CL, the refrigerant swirls in the swirl space SS at such a velocity of swirl flow that more vapor-phase refrigerant exists on an inner radius side than on an outer radius side and the velocity of swirl flow on the swirl center line CL at one end side in the swirl space SS and the velocity of swirl flow on the swirl center line at the other end side in the swirl space SS are different from each other. The swirl space SS may be configured such that a vapor phase ratio of the refrigerant in the swirl space on the other end side is higher than a vapor phase ratio on the one end side, the first refrigerant outflow port is configured to reduce a refrigerant passage area so as to decompress refrigerant and is arranged on an extended line of the swirl center line at the one end side, and the second refrigerant outflow port 243 may be configured to reduce a refrigerant passage area so as to decompress refrigerant and may be arranged on the extended line of the swirl center line at the other end side. In this case, the refrigerant distributor 24 may include a tapered portion 244 connected to the first refrigerant outflow port 242, and a body member 245. The tapered portion 244 may have therein a refrigerant passage area gradually enlarged toward a refrigerant downstream side. The body member 245 may include a refrigerant suction port 245a from which refrigerant is drawn by a jet flow of the refrigerant injected from the tapered portion 244, and a diffuser portion 245b for increasing a pressure of mixed refrigerant of the refrigerant injected from the tapered portion and the refrigerant drawn from the refrigerant suction port 245a. The refrigerant outlet side of the suction-side evaporator 25 may be coupled to the refrigerant suction port 245a of the body member 245, and the second refrigerant outflow port 243 may be coupled to the suction side of the compressor 12.

Alternatively, the refrigeration cycle device may include a compressor 12 configured to compress refrigerant, a radiator 13, 23 configured to radiate heat from the refrigerant discharged from the compressor 12, a refrigerant distributor 24 having a refrigerant inflow port 241 from which the refrigerant flowing out of the radiator 13, 23 is introduced and first and second refrigerant outflow ports 242, 243 from which the refrigerant flows out, an outflow-side evaporator 15 disposed to evaporate the refrigerant flowing from the first refrigerant outflow port 242 and letting the refrigerant flow out to a suction side of the compressor, and a suction-side evaporator 25 disposed to evaporate the refrigerant flowing from the second refrigerant outflow port 243. Even in this case, the refrigerant distributor 24 may include a body portion defining a swirl space SS for swirling the refrigerant flowing from the refrigerant inflow port 241. When a line connecting the swirl centers of refrigerant swirling in the swirl space is taken as swirl center line CL, the refrigerant swirls in the swirl space SS at such a velocity of swirl flow that more vapor-phase refrigerant exists on an inner radius side than on an outer radius side and the velocity of swirl flow on the swirl center line CL at one end side in the swirl space SS and the velocity of swirl flow on the swirl center line CL at the other end side in the swirl space SS are different from each other. The swirl space SS may be configured such that a vapor phase ratio of the refrigerant in the swirl space SS on the other end side is higher than a vapor phase ratio on the one end side, the first refrigerant outflow port 242 may be configured to reduce a refrigerant passage area so as to decompress refrigerant and is arranged on an extended line of the swirl center line at the one end side, and the second refrigerant outflow port 243 may be configured to reduce a refrigerant passage area so as to decompress refrigerant and may be arranged on the extended line of the swirl center line at the other end side. The refrigerant distributor may include a tapered portion 244 connected to the first refrigerant outflow port 242, and a body member 245. The tapered portion 244 may have therein a refrigerant passage area gradually enlarged toward a refrigerant downstream side. The body member 245 may include a refrigerant suction port 245a from which refrigerant is drawn by a jet flow of the refrigerant injected from the tapered portion 244, and a diffuser portion 245b for increasing a pressure of mixed refrigerant of the refrigerant injected from the tapered portion 244 and the refrigerant drawn from the refrigerant suction port 245a. In this case, a refrigerant outlet side 245a of the suction-side evaporator 25 is coupled to the refrigerant suction port 245a of the body member 245.

The refrigeration cycle device may be suitably changed without being limited to the above examples.

What is claimed is:

1. A refrigerant distributor for a refrigeration cycle device comprising:
 a body portion defining a swirl space configured to swirl a refrigerant;
 a refrigerant inflow port from which the refrigerant flows into the swirl space; and
 first and second refrigerant outflow ports which cause the refrigerant in the swirl space to flow out and distributes the refrigerant to components of the refrigeration cycle device connected to the first and second refrigerant outflow ports, wherein
 when a line connecting swirl centers of refrigerant swirling in the swirl space is taken as a swirl center line, the refrigerant swirls in the swirl space at such a velocity of a swirl flow that more vapor-phase refrigerant exists on an inner radius side than on an outer radius side and the velocity of swirl flow on the swirl center line at one end side and the velocity of swirl flow on the swirl center line at the other side are different from each other,
 the first refrigerant outflow port is arranged on an extended line of the swirl center line at the one end side,
 the second refrigerant outflow port is arranged on the extended line of the swirl center line at the other end side,
 the first and second refrigerant outflow ports reduce a refrigerant passage area so as to decompress the refrigerant, and at least the first refrigerant outflow port comprises a fixed throttle in which the refrigerant passage area is fixed and throttled,
 wherein the body portion defines a decreasing cross sectional area so as to define a conical shape and the first refrigerant outflow port defines an increasing cross sectional area with respect thereto, the body portion and the first refrigerant outflow port being immediately adjacent to one another forming a one piece construction.

2. The refrigerant distributor according to claim 1,
 wherein the swirl space includes a tapered space having a sectional area perpendicular to a direction in which the first refrigerant outflow port and the second refrigerant outflow port are connected together, and the sectional area of the tapered space in the swirl space is gradually reduced toward one of the first and second refrigerant outflow ports.

3. A refrigeration cycle device comprising the refrigerant distributor according to claim 1.

4. A refrigeration cycle device comprising:
 a lower stage compression mechanism configured to compress low-pressure refrigerant until the refrigerant is turned into intermediate-pressure refrigerant and to discharge the intermediate-pressure refrigerant;
 a higher stage compression mechanism configured to compress the intermediate-pressure refrigerant discharged from the lower stage compression mechanism until the refrigerant is turned into high-pressure refrigerant and to discharge the high-pressure refrigerant;
 a radiator configured to radiate heat from the refrigerant flowing out of the higher stage compression mechanism;
 a refrigerant distributor having a refrigerant inflow port from which the refrigerant from the radiator is introduced therein and first and second refrigerant outflow ports from which the refrigerant flows out; and
 an evaporator disposed to evaporate refrigerant at a refrigerant downstream side of the first refrigerant outflow port, and letting the refrigerant flow out to a suction side of the lower stage compression mechanism, wherein
 the refrigerant distributor includes a body portion defining a swirl space in which the refrigerant flowing from the refrigerant inflow port is swirled,
 when the line connecting the swirl centers of refrigerant swirling in the swirl space is taken as swirl center line, the refrigerant in the swirl space swirls at such a velocity of swirl flow that more vapor-phase refrigerant exists on an inner radius side than on an outer radius side and the velocity of swirl flow on the swirl center line at one end side and the velocity of swirl flow on the swirl center line at the other end side are different from each other, the first refrigerant outflow port reduces a refrigerant passage area so as to decompress refrigerant and is arranged on an extended line of the swirl center line at the one end side, the second refrigerant outflow port reduces a refrigerant passage area so as to decompress refrigerant and is arranged on the extended line of the swirl center line at the other end side, the second refrigerant outflow port is coupled to a suction side of the higher stage compression mechanism, and at least the first refrigerant outflow port comprises a fixed throttle in which the refrigerant passage area is fixed and throttled, wherein the body portion defines a decreasing cross sectional area so as to define a conical shape and the first refrigerant outflow port defines an increasing cross sectional area with respect thereto, the body portion and the first refrigerant outflow port being immediately adjacent to one another forming a one piece construction.

5. A refrigeration cycle device comprising:
a compressor configured to compress a refrigerant;
a radiator configured to radiate heat from the refrigerant flowing out of the compressor;
a refrigerant distributor causing the refrigerant flowing out of the radiator to flow thereinto from a refrigerant inflow port and causing the refrigerant to flow out of first and second refrigerant outflow ports; and
an evaporator disposed to evaporate refrigerant at a refrigerant downstream side of the first refrigerant outflow port, and letting the refrigerant flow out to a suction side of the compressor, wherein
the refrigerant distributor includes a body portion defining a swirl space in which the refrigerant flowing from the refrigerant inflow port is swirled, when the line connecting the swirl centers of refrigerant swirling in the swirl space is taken as swirl center line, the refrigerant in the swirl space swirls at such a velocity of swirl flow that more vapor-phase refrigerant exists on an inner radius side than on an outer radius side and the velocity of swirl flow on the swirl center line at one end side and the velocity of swirl flow on the swirl center line at the other end side are different from each other, the first refrigerant outflow port reduces a refrigerant passage area so as to decompress refrigerant and is arranged on an extended line of the swirl center line at the one end side, the second refrigerant outflow port reduces a refrigerant passage area so as to decompress refrigerant and is arranged on the extended line of the swirl center line at the other end side, the second refrigerant outflow port is coupled to a suction side of the compressor, and at least the first refrigerant outflow port comprises a fixed throttle in which the refrigerant passage area is fixed and throttled, wherein the body portion defines a decreasing cross sectional area so as to define a frustoconical shape and the first refrigerant outflow port defines an increasing cross sectional area with respect thereto, the body portion and the first refrigerant outflow port being immediately adjacent to one another forming a one piece construction.

6. The refrigeration cycle device according to claim 4, further comprising
an accumulator disposed at a refrigerant upstream side of the lower stage compression mechanism to separate the refrigerant drawn into the lower stage compression mechanism into vapor and liquid and to store therein liquid-phase refrigerant.

7. The refrigerant distributor according to claim 1, wherein the refrigerant inflow is open in a direction perpendicular to the extended line of the swirl center line.

8. The refrigerant distributor according to claim 4, wherein the refrigerant inflow is open in a direction perpendicular to the extended line of the swirl center line.

9. The refrigerant distributor according to claim 5, wherein the refrigerant inflow is open in a direction perpendicular to the extended line of the swirl center line.

10. The refrigerant distributor according to claim 1, wherein the swirl space includes a frustoconical space having a first diameter and a second diameter smaller than the first diameter, the refrigerant inflow port being located in a circular cylindrical space having a diameter equal to the first diameter.

11. The refrigerant distributor according to claim 4, wherein the swirl space includes a frustoconical space having a first diameter and a second diameter smaller than the first diameter, the refrigerant inflow port being located in a circular cylindrical space having a diameter equal to the first diameter.

12. The refrigerant distributor according to claim 5, wherein the swirl space includes a frustoconical space having a first diameter and a second diameter smaller than the first diameter, the refrigerant inflow port being located in a circular cylindrical space having a diameter equal to the first diameter.

* * * * *